(12) United States Patent
Molin et al.

(10) Patent No.: US 9,412,162 B2
(45) Date of Patent: Aug. 9, 2016

(54) METHODS, SYSTEMS AND CIRCUITS FOR GENERATING MAGNIFICATION-DEPENDENT IMAGES SUITABLE FOR WHOLE SLIDE IMAGES

(71) Applicant: Sectra AB, Linkoping (SE)

(72) Inventors: Jesper Molin, Linkoping (SE); Claes Lundstrom, Linkoping (SE); Kavitha Shaga Devan, Aby (SE)

(73) Assignee: Sectra AB, Linkoping (SE)

( * ) Notice: Subject to any disclaimer, the term of this patent is extended or adjusted under 35 U.S.C. 154(b) by 149 days.

(21) Appl. No.: 14/283,682

(22) Filed: May 21, 2014

(65) Prior Publication Data
US 2015/0055844 A1 Feb. 26, 2015

Related U.S. Application Data

(60) Provisional application No. 61/988,440, filed on May 5, 2014, provisional application No. 61/868,254, filed on Aug. 21, 2013.

(51) Int. Cl.
*G06T 7/00* (2006.01)
*G06T 3/40* (2006.01)

(52) U.S. Cl.
CPC .............. *G06T 7/0012* (2013.01); *G06T 3/4053* (2013.01)

(58) Field of Classification Search
None
See application file for complete search history.

(56) References Cited

U.S. PATENT DOCUMENTS

| 6,078,307 | A | * | 6/2000 | Daly | G09G 3/3607 345/600 |
|---|---|---|---|---|---|
| 7,113,625 | B2 | * | 9/2006 | Watson | G06F 19/321 382/128 |
| 7,679,620 | B2 | | 3/2010 | Hoppe et al. | |
| 8,320,620 | B1 | * | 11/2012 | Cohen | G06K 9/6206 382/103 |
| 2001/0050999 | A1 | * | 12/2001 | Bacus | G01N 15/1475 382/128 |
| 2009/0190821 | A1 | | 7/2009 | Marugame | |
| 2010/0074508 | A1 | | 3/2010 | Shinoda et al. | |
| 2011/0026803 | A1 | | 2/2011 | Can et al. | |
| 2012/0086850 | A1 | * | 4/2012 | Irani | G06T 3/4053 348/441 |
| 2014/0233826 | A1 | * | 8/2014 | Agaian | A61B 5/7267 382/133 |
| 2014/0301665 | A1 | | 10/2014 | Saito et al. | |

FOREIGN PATENT DOCUMENTS

| WO | WO 2005/096225 A1 | 10/2005 |
|---|---|---|
| WO | WO 2011/158162 | 12/2011 |

OTHER PUBLICATIONS

Aperio Technologies, IHC Nuclear Image Analysis User's Guide, Jan. 2, 2007.*

(Continued)

*Primary Examiner* — Matthew Bella
*Assistant Examiner* — Soo Shin
(74) *Attorney, Agent, or Firm* — Myers Bigel & Sibley, P.A.

(57) ABSTRACT

Methods, systems, workstations, computer programs visually enhance features of interest in an obtained image that are otherwise only visually apparent in a high magnification sub-slide view so that the visually enhanced features are visually apparent in a low magnification whole slide view and display the visually enhanced features on a display in a whole slide low magnification image view.

25 Claims, 12 Drawing Sheets
(7 of 12 Drawing Sheet(s) Filed in Color)

(56) References Cited

OTHER PUBLICATIONS

Lopez et al. "Clustering Methods Applied in the Detection of Ki67 Hot-Spots in Whole Tumor Slide Images: An Efficient Way to Characterize Heterogeneous Tissue-Based Biomarkers" Cytometry Part A, vol. 81A, pp. 765-775, 2012.*

Elie et al. "A Simple Way of Quantifying Immunostained Cell Nuclei on the Whole Histologic Section," Cytometry Part A, 56A: 37-45, 2003.*

Rojo et al. "Critical Comparison of 31 Commercially Available Digital Slide Systems in Pathology," International Journal of Surgical Pathology, vol. 14, No. 4, Oct. 2006, pp. 285-305.*

Molin et al., "Feature-enhancing zoom to facilitate Ki-67 hot spot detection", *Proc. SPIE 9041, Medical Imaging 2014: Digital Pathology*, 90410W (Mar. 20, 2014);10 pages.

Rojo et al., "Critical comparison of 31 commercially available slide systems in pathology", *Int J Surg. Pathol.*, 2006; vol. 14(4), pp. 285-305.

Ruifrok, A. C. and D. A. Johnston (2001), "Quantification of histochemical staining by color deconvolution", *Anal Quant Cytol Histol.*, vol. 23(4), pp. 291-299.

Wilbur et al., "Whole-slide imaging digital pathology as a platform for teleconsultation: a pilot study using paired subspecialist correlations", *Arch Pathol Lab Med.*, Dec. 2009; vol. 133(12), pp. 1949-1953.

Sellaro et al., "Relationship between magnification and resolution in digital pathology systems", *J Pathol Inform*, 2013, vol. 1:21, 5 pages.

Aleskandarany et al., MIB1/Ki-67 labelling index can classify grade 2 breast cancer into two clinically distinct subgroups, Breast Cancer Res Treat, 2011, pp. 591-599, vol. 127.

Al-Janabi et al., Whole slide images as a platform for initial diagnostics in histopathology in a medium-sized routine laboratory, J Clin Pathol, 2012, pp. 1107-1111, vol. 65.

Bainbridge, Lisanne, Ironies of Automation, Automatica, 1983, pp. 775-779, vol. 19, No. 6.

Bucher, Jacqueline, Ventana Receives FDA Clearance for Ki-67 (30-9) Image Analysis and Digital Read Applications, Media Release, http://www.ventana.com/site/page?view=press-release-february28-2012, Feb. 27, 2012, 1 page.

Dekker et al., MABA-MABA or Abracadabra? Progress on Human-Automation Co-ordination, 2002, pp. 240-244, vol. 4.

Dowsett et al., Assessment of Ki67 in Breast Cancer: Recommendations from the International Ki67 in Breast Cancer Working Group, Nov. 16, 2011, pp. 1656-1664, JNCI, vol. 103, Issue 22.

Evans et al., Primary frozen section diagnosis by robotic microscopy and virtual slide telepathology: the University Health Network experience, Human Pathology, 2009, pp. 1070-1081, vol. 40.

Honma et al., Ki-67 evaluation at the hottest spot predicts clinical outcome of patients with hormone receptor-positive/HER2-negative breast cancer treated with adjuvant tamoxifen monotherapy, Breast Cancer, Mar. 12, 2013, 8 pages.

Niazi et al., Entropy based quantification of Ki-67 positive cell images and its evaluation by a reader study, Proc. of SPIE, 2013, 9 pages, vol. 8676 867601-1.

Pantanowitz et al., Experience with multimodality telepathology at the University of Pittsburgh Medical Center, J Pathol Inform, 2012, 9 pages, vol. 45, No. 45.

Riber-Hansen et al., Digital image analysis: a review of reproducibility, stability and basic requirements for optimal results, APMIS, 2011, pp. 276-289, vol. 120.

Romero et al., Ki67 proliferation in core biopsies versus surgical samples—a model for neo-adjuvant breast cancer studies, BMC Cancer, 2011, 12 pages, vol. 11, No. 341.

Roullier et al., Multi-resolution graph-based analysis of histopathological whole slide images: Application to mitotic cell extraction and visualization, Computerized Medical Imaging and Graphics, 2011, pp. 603-615, vol. 35.

Ruifrok et al., Quantification of Histochemical Staining by Color Deconvolution, Analytical and Quantitative Cytology and Histology, Aug. 2001, pp. 291-299, vol. 23, No. 4.

Stathonikos et al., Going fully digital: Perspective of a Dutch academic pathology lab, J Pathol Inform, Jun. 29, 2013, 7 pages, vol. 1, No. 15.

Stephenson et al., Standards and datasets for reporting cancers: Dataset for neuroendocrine tumours of the gastrointestinal tract including pancreas, The Royal College of Pathologists, 2012, 40 pages, $3^{rd}$ edition.

Tang et al., Objective Quantification of the Ki67 Proliferative Index in Neuroendorcrine Tumors of the Gastroenteropancreatic System: A Comparison of Digital Image Analysis With Manual Methods, Am J Surg Pathol, Dec. 2012, pp. 1761-1770, vol. 36, No. 12.

Thorstenson, Sten, Digital Pathology System, advance healthcare Network for Laboratory, http://laboratory-manager.advanceweb.com/Archives/Article-Archives/Digital-Pathology-System.aspx, date unknown but believed to be prior to the priority date of the present application, printed from the internet Aug. 13, 2014, 2 pages.

Tuominen et al., ImmunoRatio: a publicly available web application for quantitative image analysis of estrogen receptor (ER), progesterone receptor (PR), and Ki-67, Breast Cancer Research, 2010, 12 pages, vol. 12, No. R56.

Varga et al., How Reliable Is Ki-67 Immunohistochemistry in Grade 2 Breast Carcinomas? A QA Study of the Swiss Working Group of Breast- and Gynecopathologists, PLoS ONE, May 2012, 12 pages, vol. 7, Issue 5, e37379.

Silva et al., Using color in visualization: A survey, Computers and Graphics, 2011, vol. 35, pp. 320-333.

Extended European Search Report for corresponding EP Application No. EP 14181771, date Mar. 4, 2015, 7 pages.

Svensk förening för patologi, "KVAST document brösttumörer, utgåva 3.1.2" http://www.svfp.se/node/214, revision date of May 15, 2013, 49 pages.

* cited by examiner

 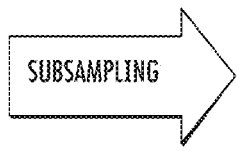 
FIG. 2A
(PRIOR ART)
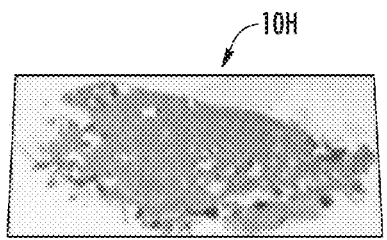 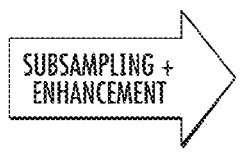 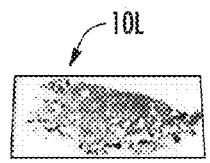
FIG. 2B
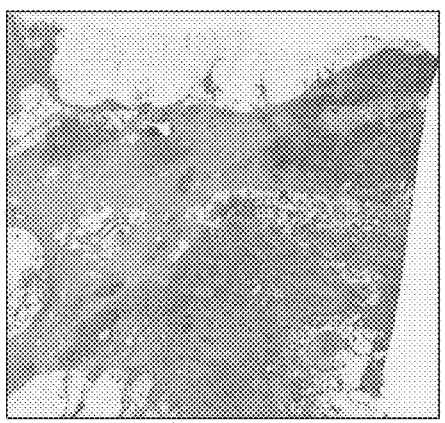 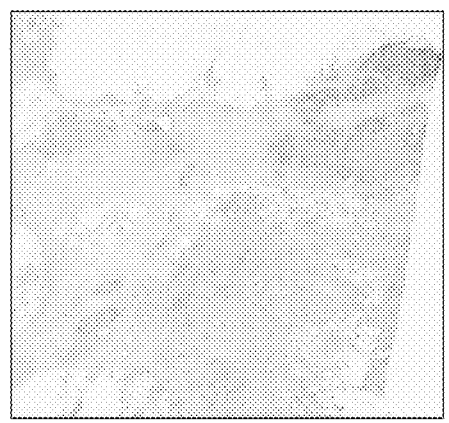
FIG. 3A        FIG. 3B

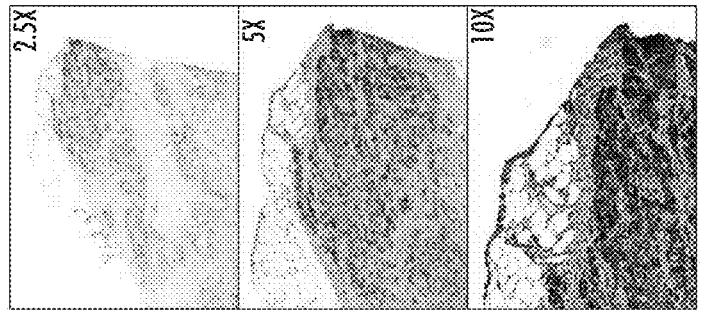
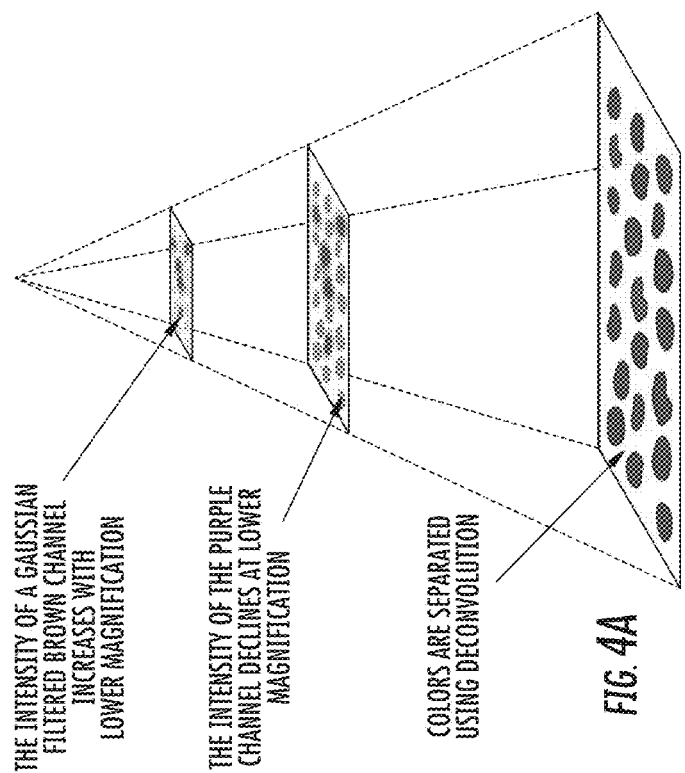
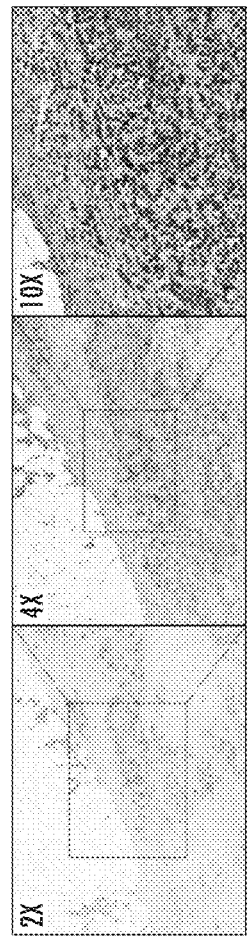

REFERENCE COLOR

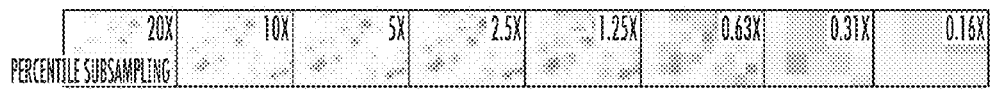
FIG. 9A
FIG. 9B
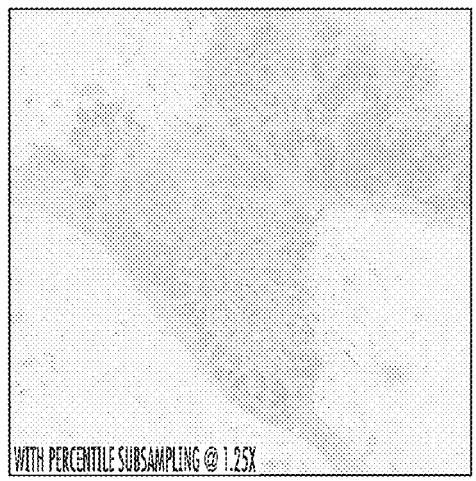    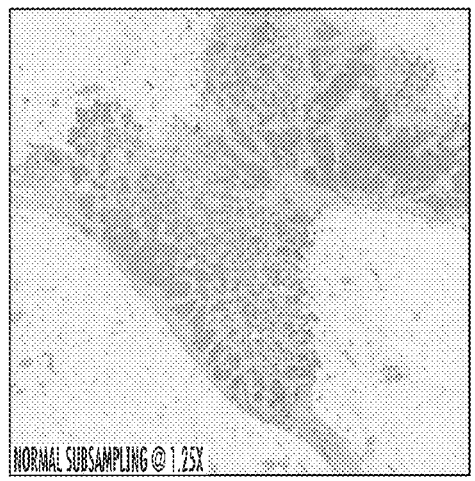
FIG. 9C             FIG. 9D

METHODS, SYSTEMS AND CIRCUITS FOR GENERATING MAGNIFICATION-DEPENDENT IMAGES SUITABLE FOR WHOLE SLIDE IMAGES

RELATED APPLICATIONS

This application claims the benefit of and priority to U.S. Provisional Application Ser. No. 61/868,254, filed Aug. 21, 2013, and U.S. Provisional Application Ser. No. 61/988,440, filed May 5, 2014, the contents of which are hereby incorporated by reference as if recited in full herein.

FIELD OF THE INVENTION

The present invention is related to medical microscopy within the digital pathology domain, such as image processing for Whole-Slide Imaging (WSI).

BACKGROUND

A pathologist's analysis of histology images is primarily subjective. Since health care practice is evidence-based, it is crucial to have reproducible methods. The subjective nature of many diagnostic tasks in anatomic pathology and cytology is, however, known to cause reproducibility problems, i.e. high inter- and intra-observer variability in many diagnostic situations. Also, efficiency improvements are highly needed.

Today there are many scanners capable of producing high-quality digital images from microscopy glass slides. See, e.g., Rojo et al., Critical comparison of 31 commercially available slide systems in pathology, Int J. Surg. Pathol., 2006; 14(4): 285-305. This digital practice is often called "WSI" or "virtual microscopy" for cytopathology. The resulting digital images can be very large, for instance 30,000×40,000 pixels, 100,000×100,000 pixels or more. In histology, a two-dimensional (2D) image often suffices, but there is also the possibility to produce slices across the depth of the tissue section, creating a three-dimensional (3D) dataset even though the extent in the z direction can be far different from the x-y directions.

A fundamental part of the diagnostic exploration in both analog microscopes and WSI viewers is to switch between different magnification levels. In the microscope, this is done by physically switching lenses and all WSI viewers offer some kind of magnification interaction. At different magnification levels, different characteristics can be studied. For example, at low magnification, tissue structure and major tissue components can be seen. One part of the pathologist's work at this level is to determine regions of interest to examine more closely. At high magnification, individual cells and cell nuclei can be studied.

Unfortunately, there is often a mismatch between the features visible at a certain magnification and the features actually appropriate for the diagnostic task at that level. Typically, the targeted situation is that overview tasks in low magnification would benefit from features expressed at high magnification. It is important to note that the high magnification features may be visually obvious at that level and no complicated analysis is required to identify them, but they may still be suppressed in the subsampling process producing the low magnification view. One example is hotspot quantification. It is common that diagnostic study or measurements should be carried out at the region of the image where there is the highest concentration of stained cells, for instance in Immunohistochemistry (IHC) staining of cancer cell nuclei. Thus, the first step is to identify this hotspot. This task is typically carried out at low magnification, since it is more efficient to have the overview of the entire slide at once. At high magnification, the targeted nuclei stand out as distinctly colored. At low magnification, however, the cells merge into a bland blur where it can be very difficult to assess cell concentration levels. Another relevant situation that can be improved is high magnification image generation for more efficient analysis.

SUMMARY

Embodiments of the invention provide magnification-dependent image enhancement to, for example, make high-magnification features visible in low-magnification views and/or vice versa.

Embodiments of the invention provide high magnification image view with features expressed in low magnification. For example, image navigation in high magnification can be generated with overall structural or geometrical properties presented by low magnification features.

Embodiments of the invention provide a solution to address the mismatch between the features visible at a certain magnification and the features actually appropriate for the diagnostic task at that level. Typically, the targeted situation is that overview tasks in low magnification would benefit from features expressed at high magnification.

Embodiments of the invention are directed to methods, systems and circuits for processing digital pathology and cytology images for viewing. The methods, systems and circuits are configured to either or both: (i) programmatically visually enhance at least one feature of interest in an original digital pathology or cytology image of a tissue sample, where the at least one feature is (typically only or much more predominantly) visually apparent in a high magnification view, using data from a the image at a resolution corresponding to a high magnification view so that the at least one feature is visually apparent in a low magnification image view, and electronically displaying the at least one visually enhanced feature on a display in a partial or whole slide image low magnification view; and/or (ii) programmatically visually enhancing at least one feature of interest in an original digital pathology or cytology image of a tissue sample, where the at least one feature is visually apparent in a low magnification view, using data from a the image at a resolution corresponding to a low magnification view so that the at least one feature is visually apparent in a high magnification image view, and electronically displaying the at least one visually enhanced feature on a display in a partial or whole slide image high magnification view.

Embodiments of the present invention are directed to methods of processing digital pathology and cytology images for viewing. The methods include obtaining an original digital pathology or cytology image of a tissue sample; then performing at least one of the following: (i) programmatically visually enhancing features of interest in the obtained image that are otherwise only visually apparent in a high magnification sub-slide view so that the visually enhanced features are visually apparent in a low magnification whole slide view; and electronically displaying the visually enhanced features on a display in a whole slide low magnification image view; (ii) programmatically visually enhancing features of interest in the obtained image using data from a low magnification sub-slide view to generate a high magnification whole slide view; and electronically displaying the visually enhanced features derived from the low magnification view on a display in a whole slide high magnification image view; and/or (iii) programmatically generating a single view with concurrent high magnification and distance from border indicia; and electronically displaying the concurrent high and low magnification features in the single view on a display.

The programmatic enhancement can be carried out using step (i) by extracting features with a defined color from a high-magnification view of the original image and presenting the extracted features in the defined color with an expanded extent of the extracted features in the visually enhanced low magnification whole slide image view, relative to an unenhanced low magnification whole slide image view.

The extracted features can include features associated with at least one defined color. The color can be within colors found in the original image at one or more magnification levels.

The extracted features can include brown stained nuclei associated with proliferation, mitosis or other characteristic of a disease such as cancer. The programmatic enhancement can be carried out so that the brown stained nuclei are visually enhanced features shown as visually enhanced brown features in the low magnification whole slide image view.

The method can include applying hot spot detection of the stained nuclei using the visually enhanced brown stained nuclei in the low magnification whole slide image.

The programmatic enhancement can be carried out using step (i) and/or (ii) and can include blurring selectively applied to the features of interest.

The programmatic enhancement can be carried out using step (i) by: electronically color deconvolving a high magnification view of the obtained image to create at least first and second separate channels, one of which is for a target feature; electronically blurring the channel of the target feature; electronically modulating the channel of the target feature to increase at least one of brightness and contrast; electronically subsampling the first and second channels to a desired magnification; and electronically generating the visually enhanced low magnification image view by recombining the channels.

The programmatic enhancement can be carried out using step (i) or (ii) by electronically applying a color-based, nearest-neighbor subsampling. A subsampled pixel value can be a value closest to a defined reference color in a perceptually calibrated color space.

The method can include allowing a user to electronically zoom the displayed view into a high magnification view of a portion of the image. The enhancement can be electronically gradually removed during the zoom such that the original image is shown when a high end of the high magnification is shown.

Either step (i) or (ii) can be carried out and the method can include allowing a user to use a user interface to selectively display a blend of the visually enhanced view with an original low magnification image to evaluate the effect of the visual enhancement.

The method can include allowing a user to use a user interface (UI) to selectively fade the visually enhanced view generated by step (i) to an original low magnification image view or to fade the original low magnification whole slide image view to the visually enhanced low magnification whole slide image view to evaluate the effect of the visual enhancement.

The obtained image can be a two-dimensional (2-D) Whole Slide Image (WSI) having between about $1\times10^6$ pixels to about $1\times10^{12}$ pixels.

The obtained image can be a three-dimensional (3-D) Whole Slide Image, with a z extent that has a plurality of slices across a depth of a tissue section with less pixels in the z extent relative to x and y extents.

Step (i) can be carried out and the displaying can include displaying the low magnification whole slide image with the visually enhanced features as a small window or insert in a larger window of a high magnification view of a portion of the WSI. Color associated with a target feature can be shown with a common visually perceptive color, and a perimeter can be shown about an area in the low magnification WSI corresponding to the displayed high magnification view shown in the larger window.

The method can include providing the single view as a navigation view that allows image navigation in high magnification with an overlay of distance indicia optionally derived from low magnification feature data.

Still other embodiments are directed to methods of providing different magnification views of digital pathology and cytology images using a viewer. The methods include: obtaining an original digital pathology or cytology Whole Slide Image (WSI) of a tissue sample having a data set of between about $10^4\times10^4$ pixels to about $10^6\times10^6$ pixels; and automatically programmatically extracting features at a first magnification level and enhancing the extracted features so that they appear in an image view at a different second magnification level in a visually enhanced manner relative to corresponding unenhanced features in the WSI at the different magnification level.

The extracting and enhancing can be carried out using at least one of the following: (a) electronically applying a color-based, nearest-neighbor subsampling, using a subsampled pixel value that is a value closest to a defined reference color in a perceptually calibrated color space; or (b) electronically color deconvolving a high magnification view of the obtained image to create at least first and second separate channels, one of which is for a target feature; electronically blurring the channel of the target feature; electronically modulating the channel of the target feature to increase at least one of brightness and contrast; electronically subsampling the first and second channels to a desired magnification; and electronically generating a visually enhanced image view by recombining the channels.

The method can include displaying the WSI with visually enhanced features at the different magnification level, and allowing a user to electronically zoom the displayed view into a high magnification view of a portion of the image. The visual enhancement can be electronically gradually removed during the zoom such that the original image in unenhanced form is shown when a high end of the high magnification is displayed.

High magnification features can be used to visually enhance lower magnification features.

Low magnification features can be used to visually enhance higher magnification features.

The method can include allowing a user to use a user interface to selectively display a blended view of the visually enhanced features with an original low magnification image to evaluate the effect of the visual enhancement.

The method can include allowing a user to use a user interface (UI) to selectively fade an image with the visually enhanced features to an original low magnification image view or to fade an original low magnification WSI view to a visually enhanced low magnification WSI view to evaluate the effect of the visual enhancement.

The first magnification level can be at magnification level that is at least ten times greater than the second magnification level. The method can include electronically generating a view of the visually enhanced features in the second magnification level using a construction with undersampling of pixels in the original data set.

The method can be carried out as a semi-automated tool to artificially enlarge positive nuclei associated with proliferation, mitosis or other characteristic of disease such as cancer at low magnification for increasing visibility of hot spots for a pathologist.

The method can be carried out to visually enhance features so that image navigation is provided in high magnification with overall tissue structure and/or at least one geometrical property concurrently presented by low magnification features.

Yet other embodiments are directed to computer program products for providing magnification-specific whole slide image (WSI) viewers. The computer program products include a non-transitory computer readable storage medium having computer readable program code embodied in the medium. The computer-readable program code include: computer readable program code configured to receive an original whole slide image (WSI) of a pathology or cytology sample of a subject; and computer readable program code configured to automatically extract features at a first magnification level and enhance the extracted features so that they appear in an image view at a different second magnification level in a visually enhanced manner relative to corresponding unenhanced features in the WSI at the second magnification level.

The first magnification level can be at magnification level that is at least ten times greater than the second magnification level.

The computer program product can also include computer readable program code configured to generate the view of the visually enhanced features in the second magnification level using an undersampled pixel construction.

Still other embodiments are directed to systems for evaluating Whole Slide Images (WSI). The systems include: a display; and a circuit in communication with the display. The circuit includes at least one processor configured to automatically extract features of a respective WSI at a first magnification level and enhance the extracted features so that they appear visually enhanced in an image view at a different second magnification level relative to corresponding unenhanced features in the WSI at the second magnification level.

The first magnification level can be at magnification level that is at least ten times greater than the second magnification level.

The view of the visually enhanced features in the second magnification level can be constructed with undersampling of pixels.

The circuit can be configured to enhance the features so that image navigation is provided in high magnification generated with overall tissue structure and/or at least one geometrical property thereof is presented by low magnification features.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 2A is a schematic illustration of a prior art subsampling protocol.

FIG. 2B is a schematic illustration of a new subsampling protocol that has feature preservation for visual enhancement of image views according to embodiments of the present invention.

FIG. 3A is an example of a magnified view of an original image.

FIG. 3B is an example of an enhanced image of the original image shown in FIG. 3A that emphasizes brown staining according to embodiments of the present invention.

FIG. 4A is a schematic illustration of magnification-dependent images at lower (top image) to higher resolutions based on magnification dependent processing according to embodiments of the present invention.

FIGS. 4B, 4C and 4D are magnification dependent images of an ROI at 2.5×, 5× and 10× magnification based on feature-enhancing zoom processing as schematically illustrated in FIG. 4A according to embodiments of the present invention.

FIGS. 5A-5C are images of different zoom magnifications with defined contrast according to embodiments of the present invention.

FIG. 9A is a series of small images illustrating percentile subsampling at exemplary different defined magnification levels (20× to 0.16×) with exemplary different percentiles according to embodiments of the present invention.

FIG. 9B is a series of images illustrating normal subsampling at the same magnification levels shown in FIG. 9A.

FIG. 9C is an enlarged image with percentile subsampling at 1.25× according to embodiments of the present invention.

FIG. 9D is an enlarged image with normal subsampling at 1.25×.

DETAILED DESCRIPTION OF EMBODIMENTS OF THE INVENTION

Figure 1:
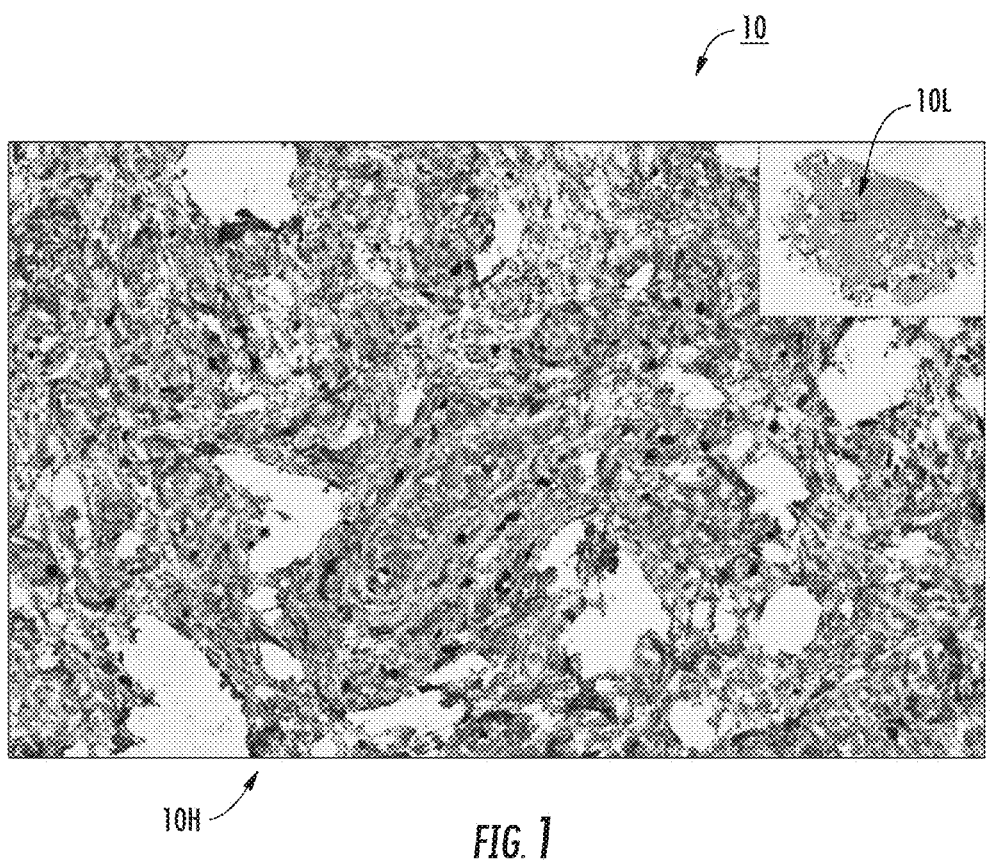
FIG. 1 is a high-magnification digital image with a low-magnification overview image insert.

The present invention will now be described more fully hereinafter with reference to the accompanying drawings, in which some embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art. Like numbers refer to like elements throughout. It will be appreciated that although discussed with respect to a certain embodiment, features or operation of one embodiment can apply to others.

In the drawings, the thickness of lines, layers, features, components and/or regions may be exaggerated for clarity and broken lines (such as those shown in circuit or flow diagrams) illustrate optional features or operations, unless specified otherwise. In addition, the sequence of operations (or steps) is not limited to the order presented in the claims unless specifically indicated otherwise.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Like numbers refer to like elements throughout. In the figures, the thickness of certain lines, layers, components, elements or features may be exaggerated for clarity. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected" or "coupled" to another feature or element, it can be directly connected to the other element or intervening elements may be present. In contrast, when a feature or element is referred to as being "directly connected" or "directly coupled" to another element, there are no intervening elements present. The phrase "in communication with" refers to direct and indirect communication. Although described or shown with respect to one embodiment, the features so described or shown can apply to other embodiments.

The term "circuit" refers to software embodiments or embodiments combining software and hardware aspects, features and/or components, including, for example, at least one processor and software associated therewith embedded therein and/or executable by and/or one or more Application Specific Integrated Circuits (ASICs), for programmatically directing and/or performing certain described actions, operations or method steps. The circuit can reside in one location or multiple locations, it may be integrated into one component or may be distributed, e.g., it may reside entirely in a workstation or single computer, partially in one workstation, cabinet, or computer, or totally in a remote location away from a local display at a workstation. If the latter, a local computer and/or processor can communicate over a LAN, WAN and/or internet to transmit patient images.

The term "automatically" means that the operation can be substantially, and typically entirely, carried out without human or manual input, and is typically programmatically directed and/or carried out. The term "electronically" includes both wireless and wired connections between components. The term "programmatically" means that the operation or step can be directed and/or carried out by a digital signal processor and/or computer program code. Similarly, the term "electronically" means that the step or operation can be carried out in an automated manner using electronic components rather than manually or using merely mental steps.

The term "clinician" refers to a pathologist, physician, oncologist, or other personnel desiring to review medical data of a subject, which is typically a live human or animal patient but forensic uses are also contemplated.

The term "user" refers to a person, or device associated with that person, that uses the noted feature or component, such as a technician, pathologist or other expert, clinician or patient.

The term "about" means that the recited parameter can vary from the noted value, typically by +/−20%.

The term "PACS" refers to PICTURE ARCHIVING AND COMMUNICATION SYSTEM.

The term "magnification" means the image resolution measured in micrometers per pixel, applicable both for the scanned image and the images displayed on screen. Higher magnification corresponds to a lower micrometer per pixel value than lower magnification and vice versa.

The term "high magnification" means displaying an image with an on-screen magnification relatively close to the magnification with which the original image was scanned. Current (2013) clinical scanning protocols commonly employ 200 times or 400 times magnification, corresponding to 0.5 and 0.25 micrometers per pixel respectively. In this case, "high magnification" corresponds to a magnification range of between about 0.1 micrometers (i.e., microns) to about 1 micron per pixel, more typically between about 0.1 micron to about 0.5 micron per pixel.

The term "low magnification" means displaying an image with an on-screen magnification substantially lower than the magnification with which the original image was scanned. In the case of using a scanning protocol of 0.5 or 0.25 micrometers per pixel, "low magnification" corresponds to magnification range of about 2 micrometers per pixel and above, for example about 10 micrometers per pixel.

The zoom letter "×" indicates a mathematical ("times") multiplier factor associated with a magnification level indicated by the adjacent number, e.g., 0.1×, 1×, 1.25×, 10× and the like, which means that the zoom view is shown at the noted magnification level relative to the original image. Thus, the 1×, 10× and the like descriptors for the digital image refer to the "true optical magnification" of the objective inside the slide scanner. These measures are intended to relate to the visual experience of using the 1×, 10×, etc., objective in a microscope. However, the perceived resolution also depends on other factors: the sensor pixel size, the monitor resolution and the viewing distance. See, e.g., Sellaro et al., Relationship between magnification and resolution in digital pathology systems, J Pathol Inform 2013; 4:21, the contents of which are hereby incorporated by reference as if recited in full herein. The microns per pixel definition refers to the digital image itself (not monitor resolution and viewing distance, that may vary). To be clear, a certain micron per pixel number is not exactly coupled to a magnification factor such as 10× as the viewers can be used for various different systems and laboratories. However, these magnification levels are used as a short hand herein, e.g., so as to refer to a certain micron value per pixel, so that, for example, 10× is a convenient short hand for a digital image with a resolution of approximately 1 micron per pixel. The magnification level is decoupled from the resolution in which the digital image was acquired, for example, an image acquired at 40× can be displayed at the zoom level of 10×.

The digital image can be of a glass (or other suitable substrate) slide of a tissue sample depicted by a medical microscope. The digital image can be high resolution and have between about $1 \times 10^3$-$1 \times 10^{12}$ pixels, and a magnification typically about 0.1-1 micron per pixel, more typically between about 0.1-0.5 micrometers per pixel.

The term "viewer" refers to an electronic interface that allows a user to select to display different magnification levels of target tissue, typically tissue associated with WSI.

The term "original" image refers to a source digital image from a digital scanner that has not been image processed to alter features for enhancement.

The term "visually apparent" refers to whether a user/clinician can see and recognize a visual feature that may have potential interest in an image using a viewer and a display at the noted magnification. If a feature or features (e.g., stained nuclei) is/are not visually apparent, then that the feature is difficult, if not impossible, for a user to see or recognize as potentially relevant on the display at the normal (non visually enhanced/unprocessed) image view, e.g., a low magnification view. In contrast, if a feature is visually enhanced to be visually apparent, that feature has been automatically digitally altered from its original pixel(s) or added to be visually enhanced so that a clinician/user can more readily see and recognize the feature on the display as potentially clinically relevant using the viewer relative to a corresponding magnification view of the original image data. The visually apparent feature can be configured so that as a user moves from one magnification to a different defined magnification (or magnifications) that feature is readily and explicitly visually represented. Thus, where the at least one feature is otherwise visually apparent only in a high magnification view, that feature on a display using a viewer is not visible at all and/or that is not readily visually recognizable to a human eye of a user in the low magnification view (e.g., below about 1.5×) using only the original image data without visual enhancement. While a visually enhanced feature or features will be readily apparent to any user, one way to assess whether a feature is visually enhanced so as to be visually apparent is to have a panel or a plurality of different pathologists review an image view to see if they would agree or disagree that the feature of interest is visually apparent in the visually enhanced view and an affirmative or "yes" response from more than half (typically 8/10 or more) would indicate that the feature is visually enhanced.

The term "blurring" refers to applying an image processing algorithm that spreads local image features across a wider area, for example through a Gaussian filter.

The term "faded" and derivatives thereof refer to altering a visualization or view to reduce the contribution of enhanced processing to make the contribution less visually dominant in a visualization/view by dimming or reducing one or more of the intensity, brightness, color, or opacity of enhanced features to return the image/feature to its original, unenhanced condition.

The term "blended" and derivatives thereof refer to an image view that combines pixel data from an original or unprocessed digital image with modified pixel data to generate the visually enhanced feature(s) at one or more zoom levels. The blend can vary at different magnification zoom levels or range of levels which can vary the visual appearance of the visually enhanced at least one feature at the different magnification levels or ranges of levels.

The terms "expanded extent" or "extent expanding" and the like are used interchangeably and refer to an optional spatial expansion of an extent of a targeted pixel associated with a feature of interest in a presented view. For example, blurring, a color-based nearest-neighbor subsampling, and/or percentile subsampling, discussed below, or other image processing technique can expand the spatial extent of a targeted feature (e.g., one or more pixels) from one magnification view to another magnification view. This is in contrast to merely increasing the brightness of a pixel in a high magnification view for presentation in a low-magnification view as this does not have much effect if it still corresponds to just a small fraction of a pixel (e.g., $1/10^{th}$ of a pixel) in low-magnification. Thus, embodiments of the invention employ "extent-expanding" image processing of targeted pixels associated with the feature/s of interest between different magnification views to provide artificially enlarged or increased size features, e.g., the size of positive nuclei.

The term "semi-automated" refers to an image processing system, method, module or circuit that employs user (e.g., pathologist) input with image enhancements to reduce variability due to user subjectivity to determine hot spots rather than a fully automated classification system. FIG. 1 is a high magnification view 10 of a tissue sample on a display which includes diagnostically relevant cells stained in brown. The inset, top right, is a low magnification overview 10L with a perimeter line denoting the position of the high magnification view 10H. Conventionally, the brown cells are not visually discernible in the low-magnification overview. However, embodiments of the invention can preserve and visually enhance the brown color of stained nuclei shown in the high level magnification view so that even when the image data is subsampled for low magnification overview, the brown color associated with the stained nuclei can be visually shown.

Generally stated, embodiments of the invention employ magnification-dependent image enhancement to make features typically visible at only one magnification level or range, appear at another magnification level or range where they otherwise would not be visually apparent. For example, embodiments of the invention can make high-magnification features visually apparent in low-magnification views such as overviews of an entire slide.

In some embodiments of the invention, the features of interest correspond to cells of a specific stain, then one of the general advantages that the invention can provide is that visual assessments involving large groups of cells can be efficiently made, such as assessing distribution and concentration across large tissue regions. For example, high-low zoom can be configured to go from individual cell views and assessments in high zoom to views in lower zooms showing larger group-level characteristics with at least one visually enhanced target feature (shown with respect to a larger tissue area relative to the high zoom) for ease of visual identification of distribution and concentration of clinically relevant cell nuclei.

The image enhancement can be carried out so that the visually enhanced processed image remains visually faithful to the visual cues of the original image. The processed appearance can, therefore, be provided in a visually familiar appearance as the user will recognize the enhancements from the high-magnification views, for instance, the color scale. Zooming to high magnification can be done in a seamless transition to the unprocessed high-magnification view, where the enhancement can (typically gradually) disappear either automatically or selectively as the zoom increases to maximum or a defined threshold.

Advantageously, the contemplated image processing approaches do not suffer from the drawbacks of explicit classification schemes. For example, a traditional way to identify a hot spot would be perform segmentation of the cell nuclei, typically using several processing steps including decision points such as thresholds for image attributes. Each such decision point is a potential error source that the user cannot control (or, if it is configurable, typically requires extensive labor). This problem is aggravated in WSI since the image characteristics differ significantly between laboratories due to differences in specimen handling such as sectioning and staining. Embodiments of the invention do not introduce any decision points in the circuit, it is simply a visual enhancement to simplify the analysis and decision making of the physician so as to provide a consistent viewer protocol that can be learned through the experience of using it. The protocol does not adapt or change over time, does not make decisions (e.g., no explicit classification) so as to remain consistent, user to user and laboratory system to system.

The image enhancement can be configured to increase a defined image feature (e.g., associated with one or more defined colors such as brown for positive nuclei) in size in one or more low magnification views by between about 25% and about 50% from its actual size, typically a subsampled image view at zoom levels between about 0.1× to about 1× zoom. However, the image enhancement is not required (and is typically not applied) to high magnification views so that it does not alter the size of features in high magnification views and/or at zooms at about 10× or above.

The image enhancement can show at least one defined feature of interest (e.g., associated with one or more defined colors) with increasing intensity in lower zooms, e.g., the intensity shown at about 2.5× is increased below this level for each defined lower level or range of lower levels to about 0.1×, for example. In addition or alternatively, the image processing can be configured to show a defined feature of no or less relevance with decreasing intensity in the lower zooms (see, e.g., FIGS. 4A-4D).

The image enhancement can be carried out to use color deconvolution or other color selection or feature extraction protocol of the original image, then generate the low magnification image enhanced views using a mixture of original pixel data from the original image with pixel data that has been modified to have an expanded extent and/or increased intensity. The mixture can be different for different zoom levels or zoom level ranges.

For example, no modification (only original pixel or image data) for zoom levels 20× to 10×, a first blend and/or mixture amount of the original image and the modified pixel data for zoom levels below 10× to 5× (e.g., about 10-25%), a second blend and/or mixture amount with increased modified pixel data (decreased original pixel data) at 2.5× to under 5× (e.g., 50%), and a third blend and/or mixture with a greater amount of the processed pixel data relative to the first and second mixture below 2.5× (e.g., about 75%), for example.

Embodiments of the invention recognize that image analysis tools in pathology and/or cytology can be challenging as they should fit well into the routine clinical workflow. In comparison to a research lab setting, this means additional requirements of precision, robustness and performance (e.g., throughput speed). For instance, waiting a few minutes for an image processing algorithm to finish is unfeasible, whereas that may be considered quite reasonable in a research setting.

FIG. 2A illustrates a conventional subsampling protocol while FIG. 2B, in comparison, illustrates an example of an image processing protocol that automatically and/or electronically extracts features of potential interest from the high magnification image 10H to preserve and/or enhance them in the sub-sampled (low magnification) image 10L.

As stated above, one problem in the example of visual hot spot detection is that high magnification can be required to see the cell nuclei, but low magnification is used to get an overview of the entire slide. Embodiments of the present invention present a processed low magnification image that preserves the structures of interest. The typical case is for cancer detection, diagnosis or evaluation, where nuclei relevant for disease assessment have been given a distinct staining, often a brown color. The new image processing method preserves and visually enhances brown nuclei into brown areas in the low magnification image, while other colors can be faded away. It is assumed to be a benefit to use a similar brown color in the enhanced/processed image, to lessen the cognitive load of switching between high and low magnification, but other color schemes and/or indicia may also be used.

FIG. 3A is an example of an original (unenhanced) image. FIG. 3B is an example of a selectively, visually enhanced image for hot spot detection, visually emphasizing brown staining with other colors faded or omitted in the visually enhanced image as generated by an image processing system according to some embodiments of the present invention.

FIG. 4A is a schematic illustration of feature-enhancing zoom to facilitate WSI review according to some embodiments of the present invention. The adjacent images of FIGS. 4B, 4C and 4D show examples of visual differences associated with feature-enhancing zoom images at different magnifications. FIG. 4A shows that at the lower image. The intensity of a purple channel or other color channel associated with a feature of less relevance can decline at lower magnification (middle image, FIG. 4A). The intensity of a feature of clinical relevance, e.g., a brown feature (top image, FIG. 4A) can be configured to increase at lower magnification relative to a higher magnification (zoomed) view, e.g., at 2.5× to about 0.1× relative to about 5× to about 10×. FIG. 4B illustrates the brown features with greater intensity than the purple (or blue) features at 2.5×. FIG. 4C illustrates the purple (or blue) features having less intensity at 5× relative to 10× (FIG. 4D).

There are several ways that image processing can be employed to achieve the visually enhanced effect of target structures and/or features. Generally stated, the colors are identified (e.g., deconvolved or otherwise identified or extracted) as shown in FIG. 4A and the pixels of target-color pixels associated (e.g., brown) can be processed. The processed image data from the original image and from the processed image data can then be combined to generate a visually enhanced image. Where color deconvolution is used, for each magnification level, a specific mix of the modified brown channel (or other defined pixel color for a target color feature) and the unmodified image can be created. The mix at each level can be chosen so that the low magnification levels can be (visually) dominated by brown cells and the high magnification levels stay unmodified.

By viewing the mixed images with an image viewer, a tool for finding and verifying hot spots was created. At low magnification levels, the modified image helped to detect hot spots. With a simple zoom interaction using a user interface, UI, such as a mouse or a GUI (e.g., a touch gesture), a hot spot can be relatively quickly verified by zooming into the real (non-enhanced) image. An example of the zooming effect is shown in FIGS. 5A-5C, FIG. 5A illustrates a 2× view, FIG. 5B illustrates a 4× view of the image in the box in FIG. 5A. FIG. 5C illustrates a 10× view of the image shown in the box in FIG. 5A but with the image not transformed or altered to reflect the original image. As the zoom increases, the image view shown can alter or transform so that the artificially enhanced image transitions into a view with only the original image data.

Figure 6:
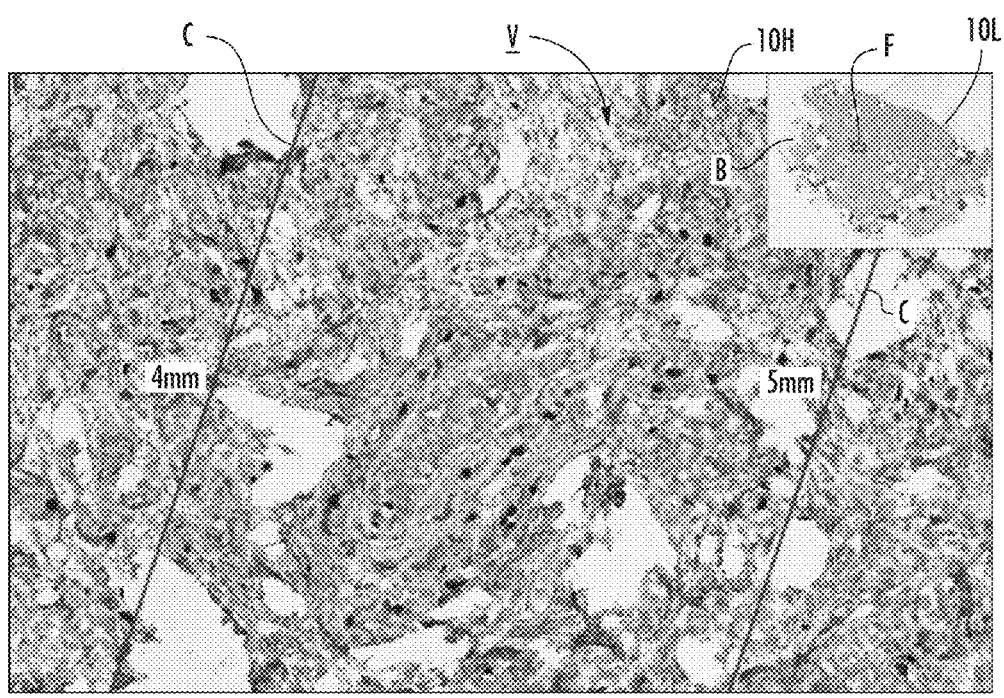
FIG. 6 is an image illustrating concurrent low and high magnification features in a view according to embodiments of the present invention.

FIG. 6 is an exemplary visualization that can concurrently present, in a single image view V an overlay of distance indicia C which provide distance information on a high magnification view. The example shows distance indicia C can be labeled with measurement data, typically in millimeter values, e.g., "4 mm" and "5 mm", such as with contour lines, which reflect the distance if the feature F shown in the high-magnification view 10H from the tissue specimen border B, which may be optionally also shown in the low magnification view with an enclosed perimeter. This type of embedding/fusion of the distance indicia C onto an image, typically a high-zoom image view, can be helpful to a reviewer. In the past, these are features that previously have only been able to be measured and assessed in a low-magnification/zoom view as one needed to be able to see both the specimen border B such as shown in a low-magnification view 10L and the point of interest associated with a high-magnification view at the same time. Thus, embodiments of the invention can electronically bring features from low magnification views to high magnification views so as to show distance indicia C without unduly disturbing the high-magnification pixel views. The distance indicia C can be provided as an overlay of one or more solid contour lines that extend across or along a noted distance, as shown, or may be provided in other visually helpful manners such as in visually translucent lines, solid or broken. In some embodiments, semi-transparent (e.g., translucent) color-coded zones or regions can be overlaid on the high magnification view. The color-coding can represent defined distances, e.g., two or three different colors for two or three different distances, e.g., in about 1-2 mm increments, for example, <4, 4-5, >5 mm from the border B. Optionally, the single view V may be provided with the two types of images 10H, 10L in separate, typically adjacent, viewing windows on a display or in a single window. Clinically, the distance from border data may be relevant because if cancer cells are close to the resection edge when cutting away a tumor, this means that there is higher risk that parts of the tumor remain in the body. Image processing, known as a "distance transform", can be used to assign border distance values for the distance contour indicia throughout the WSI or along a portion thereof. In the example shown in FIG. 6, the distance indicia values are visualized in the view as iso-contours C of about equal distance (e.g., about 4 mm and/or about 5 mm) overlayed on the high-magnification image 10H.

The view V can be dynamically updated to allow for image navigation while providing the distance indicia C.

Figure 7A:
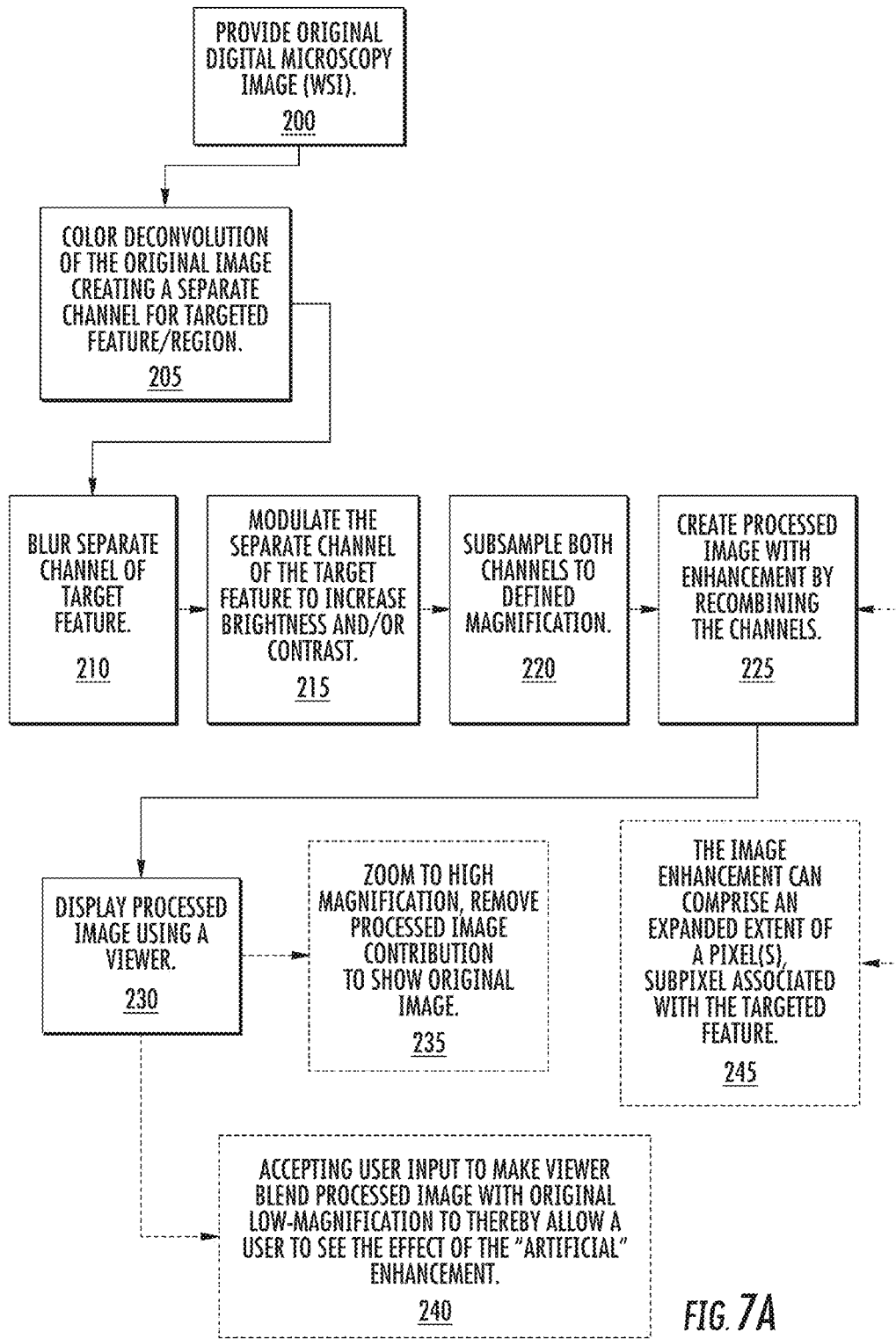
FIG. 7A is a flow chart of an exemplary image enhancement protocol according to embodiments of the present invention.
Figure 7B:
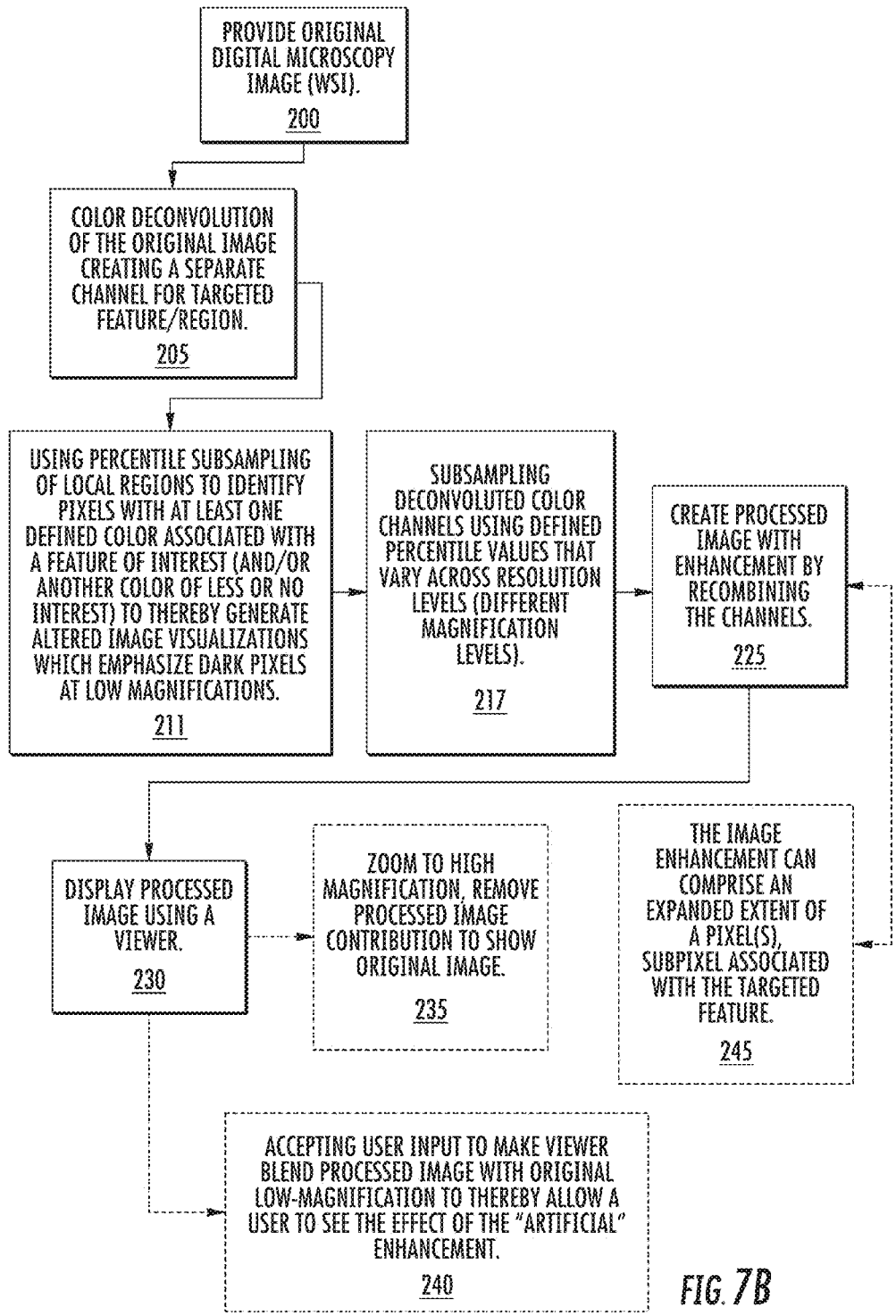
FIG. 7B is a flow chart of another exemplary image enhancement protocol according to embodiments of the present invention.

FIGS. 7A and 7B illustrate examples of processing protocols that may be used to generate the enhanced visual features according to some embodiments of the present invention. As shown in FIG. 7A, an original digital microscopy image (WSI) is provided (block 200). The image can be color deconvolved to create at least first and second channels, e.g., a separate color channel or channels for a targeted feature (block 205). The channel of the target feature can be electronically blurred (block 210). The channel of the target feature can be electronically modulated to increase at least one of brightness or contrast (block 215). The first second channels can be subsampled to a desired magnification (block 220). An image with visually enhanced image view can be generated by recombining the channels (block 225). The processed image can be displayed using a viewer (block 230). Optionally, the image can be zoomed and the processed image contribution can be removed automatically as the image view is zoomed to show the feature of the original image (block 235). The method can be carried out as a semi-automatic method that accepts user input to make the viewer blend the processed image with the original image to allow a user to visually see the contribution of the "artificial" enhancement (block 240). The enhancement can comprise an expanded extent of pixels, pixel, or sub-pixel of the targeted feature (block 245).

When a user zooms into the high-magnification image, contribution from the visually enhanced processed image can be gradually removed, such that the original image is shown when the high magnification (e.g., a high end, level or high magnification range) is reached.

The user can also be allowed to electronically elect or select to blend the processed image with a corresponding low-magnification view of the original image, in order to examine the effect of the enhancement. The system, processor, circuit or module (e.g., image processing) can be configured to correlate pixel location of enhanced pixel versus original pixel value and electronically weight one more than another.

In some embodiments, the methods, circuits/systems and/or workstations can be configured to automatically electronically applying hot spot detection of the stained nuclei using the visually enhanced (e.g., brown) stained nuclei in the whole slide image low magnification view. The UI can be allowed to select this function 129 (FIG. 13) and the display can generate a template or overlay or other indicia indicating the hot spots (e.g., a clustering of stained nuclei) detected for viewing. In some embodiments, automatic or electronic view switching and/or navigation from the low mag view to the relevant hot spot zones in a high-mag view can be selected as a viewing mode, e.g., "hot spot" preview mode which can employ the low mag visually enhanced feature(s).

In some embodiments, an image can be separated into color channels using a color deconvolution algorithm (e.g., such as described in Ruifrok and Johnston, supra). Two channels can be created, typically a brown and another color, such as a blue channel, e.g., representing the DAB and Hemotoxylin staining respectively. The brown channel contains mostly positive nuclei and the blue (or purple) channel contains other artifacts such as negative nuclei, cytoplasma and stroma. Since the color deconvolution can separate out the positive nuclei, the enlargement effect can be achieved by filtering the brown channel, such as using a Gaussian kernel with a sigma size of about 25 pixels, which causes the positive nuclei to almost double in size. To compensate for the decreased intensity caused by the Gaussian filter, the contrast of the brown channel can be increased using predefined contrast data, which can be provided in electronic format such as in a fixed linear electronic data set such as a "look-up" table. The blue channel can optionally be discarded or reduced in intensity, for example, as it may not provide any visual enhancement for hot spots.

Then, as a second step, dyadic subsampled pyramids for different magnification levels (20×, 10×, 5×, . . . ) of the modified brown channel and the unmodified image can be created. For each magnification level, a specific mix of the modified brown channel and the unmodified image can be created. The mix at each level can be chosen so that the low magnification levels can be (visually) dominated by enlarged brown cells and the high magnification levels stay unmodified. Examples of suitable levels are given in Table 1 below. See also, for example, FIGS. 4A-4D and FIG. 10A.

TABLE 1

Mix between the modified brown channel and the unmodified image for different zoom levels.

| | Zoom level | | | |
|---|---|---|---|---|
| | 20X-10X | 10X-5X | 5X-2.5X | 2.5X and below |
| Modified brown channel | 0% | 25% | 50% | 75% |
| Unmodified image | 100% | 75% | 50% | 25% |

The exemplary processing pipeline shown in FIG. 7A, for example includes color deconvolution, creating a separate channel for targeted feature→ Modulate separate channel to increase brightness and contrast→ Blur separate channel→ Increase brightness and contrast for separate channel→ Subsample both channels to required magnification→Create final view by recombining channels). See, e.g., Ruifrok, A. C. and D. A. Johnston (2001), "Quantification of histochemical staining by color deconvolution", Anal Quant Cytol Histol 23(4): 291-299, the contents of which are hereby incorporated by reference as if recited in full herein.

Other types of visual image enhancements and/or different image processing algorithms or protocols may be used. It is contemplated that the new methods/systems can provide higher reproducibility and higher efficiency in time spent for diagnostic tasks where there is a mismatch between a magnification level in which a feature is visible and a different magnification level where the pathologist needs to see it for ease of clinical evaluation and/or efficiency in the analysis.

FIG. 7B illustrates an exemplary image processing method according to some particular embodiments of the present invention. In this embodiment, the Gaussian filtering and contrast enhancement can be replaced with a sub-sampling estimator function in local regions to keep the visibility of cell nuclei to make positive nuclei stand out at low magnifications (block 211). That is, percentile subsampling of local regions can be used to identify pixels with at least one defined color associated with a feature of interest (and/or another color of less or no interest) to thereby generate altered image visualizations which emphasize dark pixels at low magnifications.

The sub-sampling estimator function can be configured to ensure that positive nuclei stand out at low magnifications using defined percentiles, where 0% is associated with a minimum pixel value in a local region (to prefer dark pixels), 50% is associated with a median pixel value (similar to Gaussian sub-sampling), and 100% is associated with a maximum pixel value (to prefer light pixels). The sub-sampling estimator function can employ different defined percentile values across resolution levels (magnification levels) (block 217) to preserve intensity of a selected feature, e.g., brown or other stained color positive nuclei percentile. One or more of the deconvolved color channels can be blended together with an unprocessed image at different zoom (magnification) levels to generate the processed image with the altered, enhanced pixel features visually emphasizing cells of potential interest (blocks 225, 230 and optionally blocks 235, 240, 245).

The percentile subsampling can be configured to identify pixel values at a certain percentile, e.g., a median filter equals percentile subsampling at about the 50% level and the percentile value can vary across the different resolution levels, with a lower value at higher magnification and a higher value at lower magnifications (e.g., higher percentile values can be used under 5× relative to magnifications above 5× and these higher magnification values can increase from 2.5× to 0.15× by about 10%). This way, the spatial extension (addressed by some embodiments by blurring) of the selected feature (e.g., the brown color channel) and its intensity in the low-resolution image (addressed by some embodiments by contrast enhancement) can be preserved. The percentile subsampling may perform with more robust results in terms of bringing relevant clinical info into the low-resolution processed image and/or can avoid creating a visual appearance of "unfocus". The percentile subsampling algorithm of the feature-enhancing zoom may result in a sharper impression at lower magnifications. Table 2 below provides some examples of percentile values that can be used for subsampling from and to the noted magnification levels according to some embodiments of the present invention.

TABLE 2

Examples of percentile values used for subsampling to and from different magnifications

| Subsampling from and to magnification: | 20X → 10X | 10X → 5X | 5X → 2.5X | 2.5X → 1.25X | 1.25X → 0.63X | 0.63X → 0.31X | 0.31X → 0.15X |
|---|---|---|---|---|---|---|---|
| Percentile value used | No processing | 0% | 14.4% | 19.5% | 23.6% | 26.9% | 29.5% |

0% = minimum pixel value, (prefer dark pixels)
50% = median pixel value, (very similar to Gaussian subsampling).
100% = maximum pixel value (prefer light pixels)

In some embodiments, the 20× to 10× magnification images can remain in original format, e.g., the pixel values are not digitally altered from the original scanned image for enhancement, as important tasks can take place at the larger high magnification zoom levels. Typical percentile values related to the pixel value are noted above. The 10× to about 5× levels can have a 0% value which means that the subsampling is carried out using a minimum pixel value to prefer dark pixels. The below 5× magnification level can have an increased pixel percentile value, typically between 10% to about 50% (with 50% corresponding to a median pixel value), and this value can increase as the magnification lessens as shown in Table 2. The magnification, image-enhancement module can be configured to use relatively aggressive subsampling in the beginning since there is still a good distance between the nuclei. An exponential decay of the percentile parameter increase can be used in order to preserve parameters of interest at low magnifications.

Figure 8A:
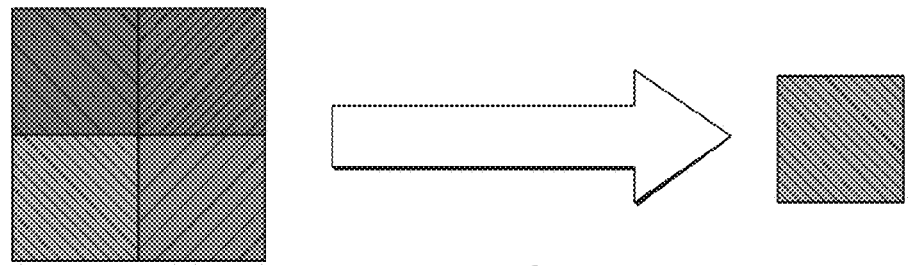
FIG. 8A is a schematic illustration of a conventional downsampling protocol that results in a weighted mixing of pixels.
Figure 8B:
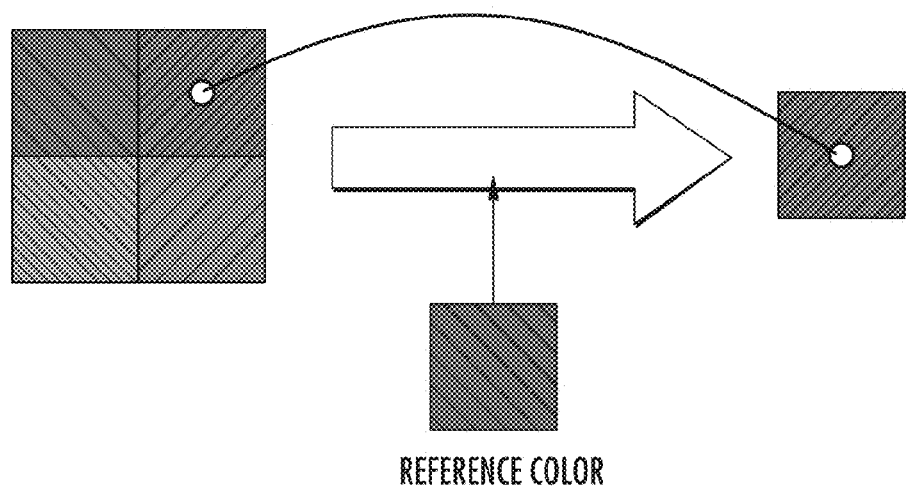
FIG. 8B is a schematic illustration of a color-based nearest-neighbor subsampling protocol according to embodiments of the present invention.

It is contemplated that there are many possible processing pipelines that can achieve similar enhancements to the deconvolution described above. One example is shown in FIG. 8B and can be referred to as "color-based nearest-neighbor subsampling," where the subsampled pixel value is the "parent" value that is closest to a reference color, where this is measured in a perceptually calibrated color space. FIG. 8A shows regular downsampling, resulting in a weighted mixing of parent pixels while FIG. 8B shows "color-based nearest-neighbor subsampling," where the parent pixel closest to a reference color is selected. The color proximity can be established through the use of color spaces with a defined distance measure, for instance the perceptually adapted color space CIELAB.

FIGS. 9A and 9B illustrate a series of thumbnail images at different resolutions using percentile subsampling (FIG. 9A) and normal subsampling (FIG. 9B) as discussed above with respect to Table 2. FIG. 9C illustrates the WSI with percentile subsampling at 1.25× while FIG. 9D illustrates the WSI with normal subsampling at 1.25×.

Figure 10A:
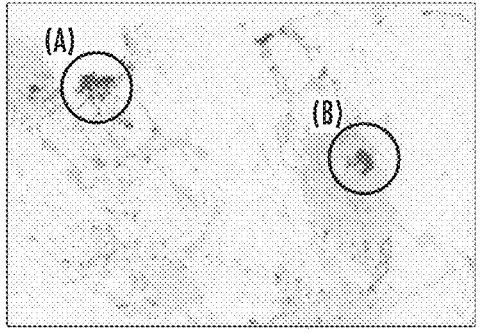
FIG. 10A is an example of a visually enhanced processed image at 1× illustrating potential features of interest or artifacts at positions (a) and (b).
Figure 10B:
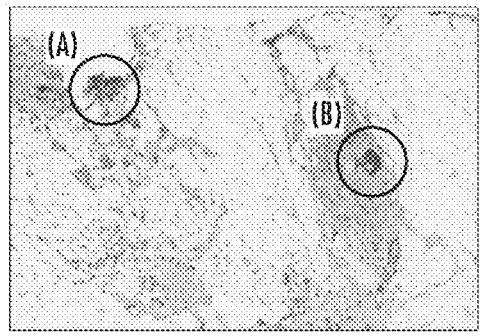
FIG. 10B is an example of another visually enhanced processed image (percentile subsampling) at 1× with the corresponding features indicated at positions (a) and (b).
Figure 11A:
FIG. 11A illustrates a zoomed image indicating feature (a) in FIGS. 10A and 10B to be an artifact.
Figure 11B:
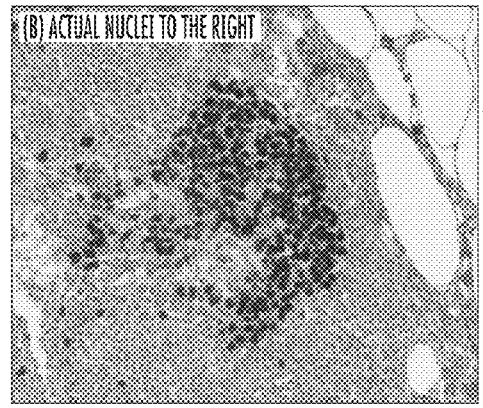
FIG. 11B illustrates a zoomed image indicating feature (b) in FIGS. 10A and 10B to indicate a positive cell region for a cell count.

FIG. 10A illustrates an image at 1× processed with a Gaussian-based blurring method (FIG. 7A) with potential features of interest at positions (a) and (b) indicated by circles. FIG. 10B illustrates a corresponding image processed with a percentile subsampling method (FIG. 7B). The image has reduced the intensity for features having colors associated with non-relevant features and/or to increase the intensity of features having a color of known significance (e.g., brown). FIG. 11A is a zoomed image of region (a) and FIG. 11B is a zoomed image of region (b). Region (a) is an artifact while region (b) is associated with actual stained nuclei. It is valuable to be able to quickly differ between the artifact (a) and the nuclei cluster (b) in the low magnification view, for example, to avoid taking unnecessary time to bring up the artifact in high magnification. The features at positions (a) and (b) appear similar in FIG. 10A whereas in FIG. 10B there is a clear visual difference between them since the cell cluster (b) is less blurred. Furthermore, more cell nuclei of the significant (clinically relevant) color are visible in FIG. 10B than in FIG. 10A.

Figure 12:
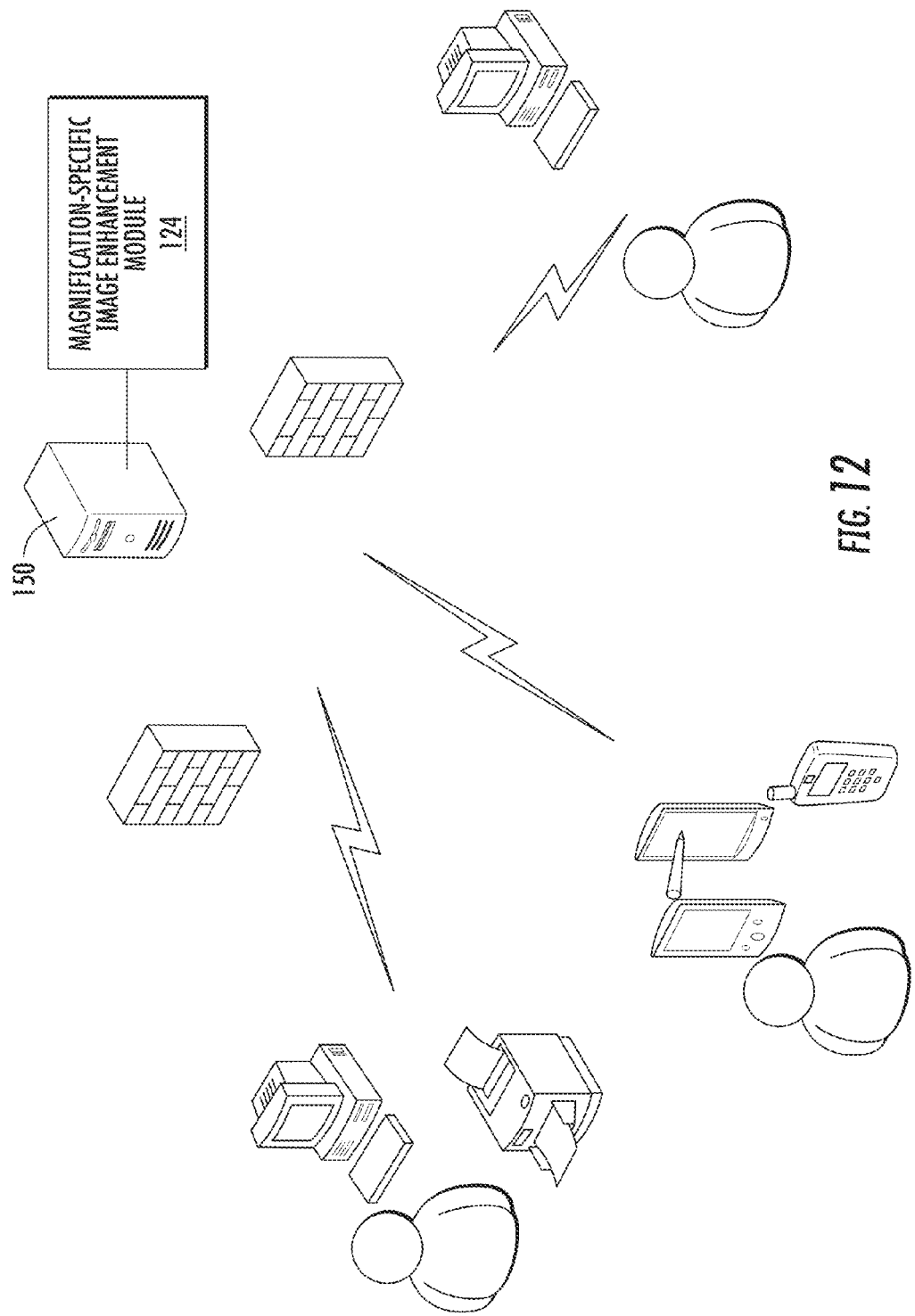
FIG. 12 is a schematic illustration of a circuit comprising a server according to embodiments of the present invention.

Turning now to FIG. 12, the magnification-specific image enhancement module 124 can reside at least in part on a server 150 that can be remote from a review/user site. Alternatively, the server 150 can be onsite or the module 124 can partially or totally reside onboard a computer associated with a clinician workstation. The server 150 can be integrated into a single server or may be distributed into one or more servers or other circuits or databases at a single physical site or at spatially separate locations. Similarly, the module 124 held by the one or more servers 150, can be distributed into multiple processors or databases or integrated into one.

The server 150 may be embodied as a standalone server or may be contained as part of other computing infrastructures. The server 150 may be embodied as one or more enterprise, application, personal, pervasive and/or embedded computer systems that may be standalone or interconnected by a public and/or private, real and/or virtual, wired and/or wireless network including the Internet, and may include various types of tangible, non-transitory computer-readable media. The server 150 may also communicate with the network via wired or wireless connections, and may include various types of tangible, non-transitory computer-readable media.

The server 150 can be provided using cloud computing which includes the provision of computational resources on demand via a computer network. The resources can be embodied as various infrastructure services (e.g., compute, storage, etc.) as well as applications, databases, file services, email, etc. In the traditional model of computing, both data and software are typically fully contained on the user's computer; in cloud computing, the user's computer may contain little software or data (perhaps an operating system and/or web browser), and may serve as little more than a display terminal for processes occurring on a network of external computers. A cloud computing service (or an aggregation of multiple cloud resources) may be generally referred to as the "Cloud". Cloud storage may include a model of networked computer data storage where data is stored on multiple virtual servers, rather than being hosted on one or more dedicated servers.

Users can communicate with the server 150 via a computer network, such as one or more local area networks (LAN), wide area networks (WAN) and can include a private intranet and/or the public Internet (also known as the World Wide Web or "the web" or "the Internet." The server 150 can include and/or be in communication with a module 124 that performs the image enhancement of WSI using appropriate firewalls for HIPPA or other regulatory compliance.

Figure 13:
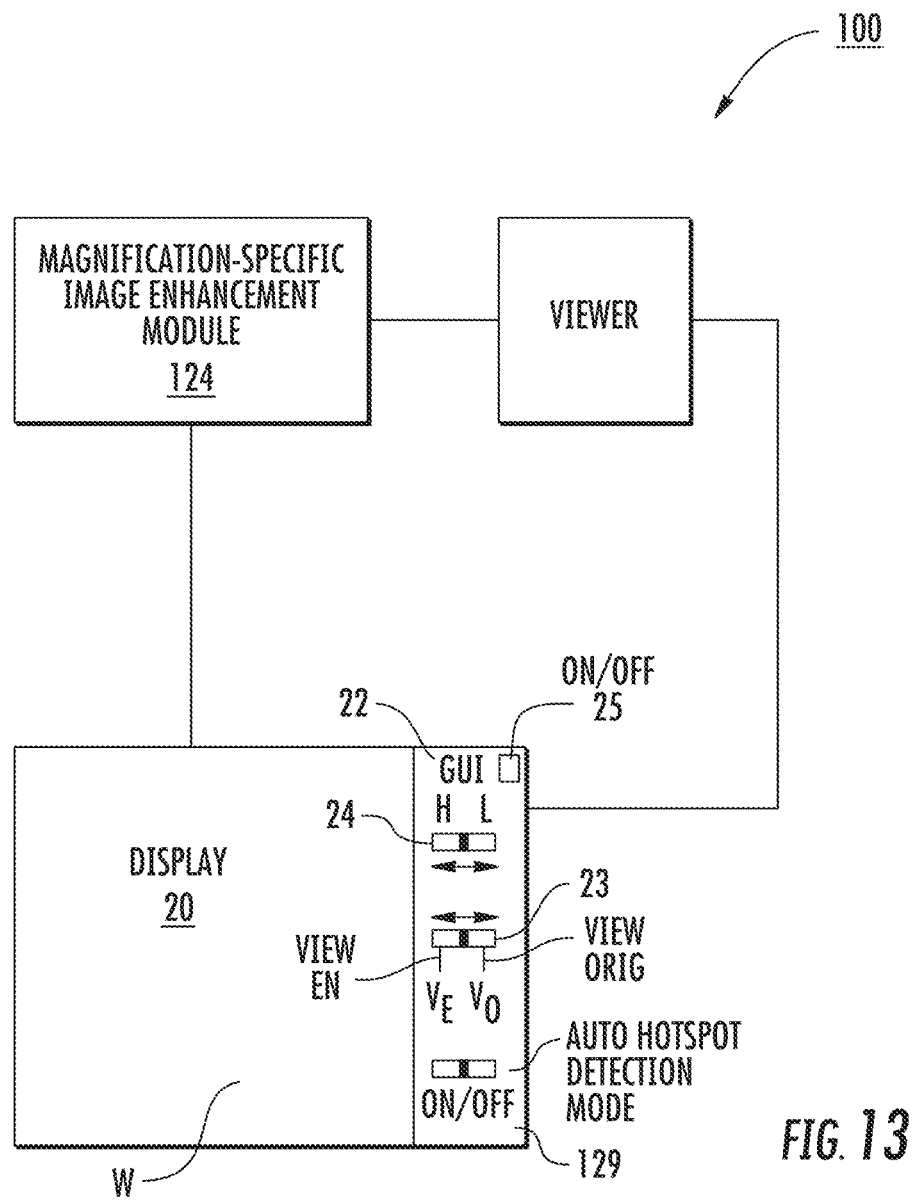
FIG. 13 is a schematic illustration of a system according to embodiments of the present invention.

FIG. 13 illustrates that the magnification-specific image enhancement module 124 can be in communication with (or onboard) at least one workstation W with a display or screen 20. It is noted that the terms "display" and "screen" are used interchangeably. The display 20 can include a UI 22 which can include touch, mouse, speech, cursor or other inputs 23 that allows a user to select the enhanced image view (Ven) or the original image (Vor). The UI 22 can allow a user to direct the circuit 100 to fade between the two different viewing formats using a slide control or the different views can be faded into or out automatically. The UI 22 can also include a high-low magnification view selection 24 and an on/off selection 25 for the image enhancement. The UI 22 may also include an automated Hot Spot Detection mode 129.

The module 124 or circuit 100 can also include one or more report output devices, including a display 20 (onboard the workstation W or associated with another computer), a printer, a facsimile machine, and pervasive computer devices such as electronic notepads, smartphones, cell phones and the like. A diagnosis based on the analyzed sample using the module 124 can be delivered by email, facsimile, and/or directly to a HIS (Hospital Information System), LIMS (Laboratory Information Management System), PACS systems, or other systems of addresses (electronic or physical).

It is noted that while embodiments of the present invention use a remote server for the image enhancement, it is contemplated that different clinic sites or each facility or room may have a dedicated on site viewer with an image enhancement analysis circuit.

Embodiments of the present invention may take the form of an entirely software embodiment or an embodiment combining software and hardware aspects, all generally referred to herein as a "circuit" or "module." Furthermore, the present invention may take the form of a computer program product on a (non-transient) computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. As noted above, the functionality of any or all of the program modules may also be implemented using discrete hardware components, one or more application specific integrated circuits (ASICs), or a programmed digital signal processor or microcontroller. The program code may execute entirely on one (e.g., a workstation) computer, partly on one computer, as a stand-alone software package, partly on the workstation's computer and partly on another computer, local and/or remote or entirely on the other local or remote computer. In the latter scenario, the other local or remote computer may be connected to the user's computer through a local area network (LAN) or a wide area network (WAN), or the connection may be made to an external computer (for example, through the Internet using an Internet Service Provider).

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

Figure 14:
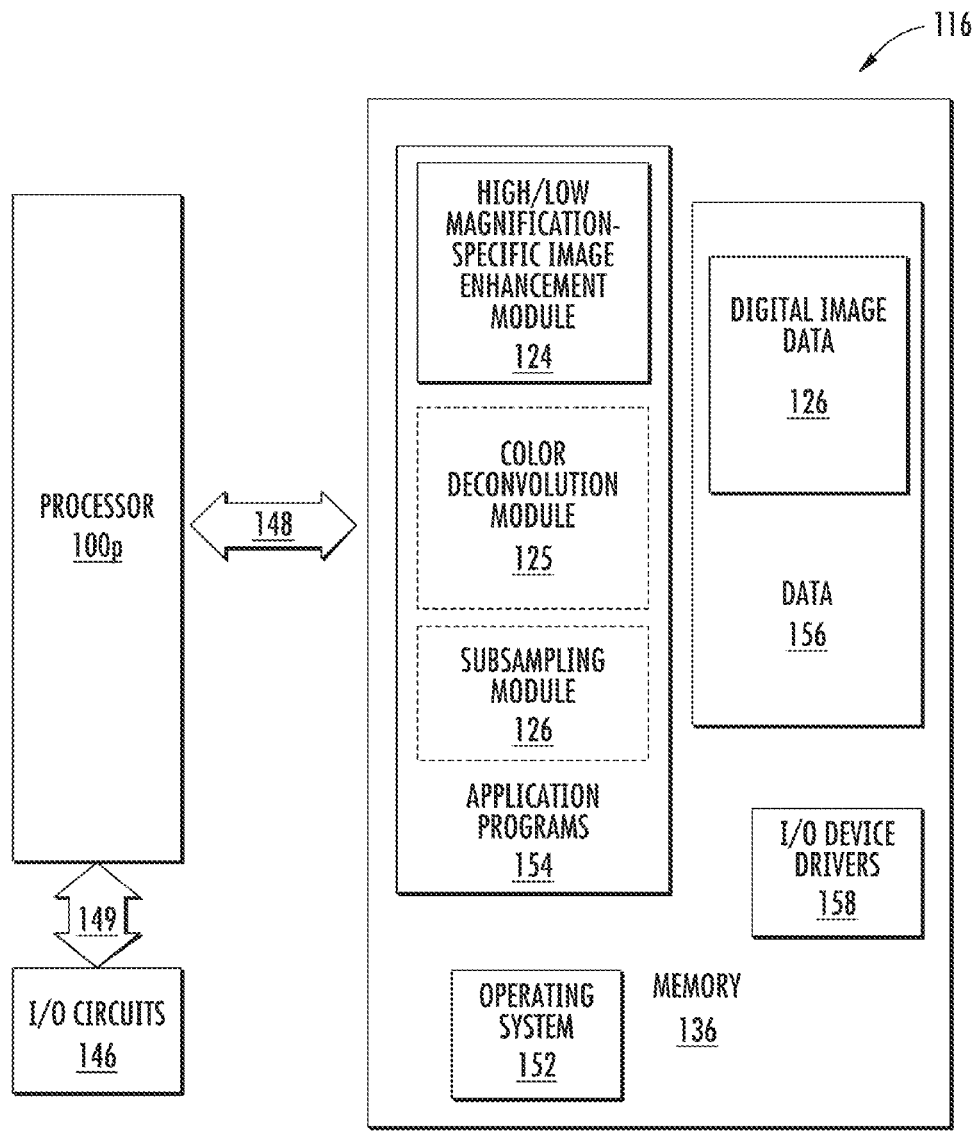
FIG. 14 is a schematic illustration of a data processing circuit according to some embodiments of the present invention.

As illustrated in FIG. 14, embodiments of the invention may be configured as a data processing system 116, which can include a (one or more) processor 100*p*, a memory 136 and input/output circuits 146. The data processing system may be incorporated in, for example, one or more of a personal computer, database, workstation W, server, router or the like. The system 116 can reside on one machine or be distributed over a plurality of machines. The processor 100*p* communicates with the memory 136 via an address/data bus 148 and communicates with the input/output circuits 146 via an address/data bus 149. The input/output circuits 146 can be used to transfer information between the memory (memory and/or storage media) 136 and another computer system or a network using, for example, an Internet protocol (IP) connection. These components may be conventional components such as those used in many conventional data processing systems, which may be configured to operate as described herein.

In particular, the processor 100*p* can be commercially available or custom microprocessor, microcontroller, digital signal processor or the like. The memory 136 may include any memory devices and/or storage media containing the software and data used to implement the functionality circuits or modules used in accordance with embodiments of the present invention. The memory 136 can include, but is not limited to, the following types of devices: ROM, PROM, EPROM, EEPROM, flash memory, SRAM, DRAM and magnetic disk. In some embodiments of the present invention, the memory 136 may be a content addressable memory (CAM).

As further illustrated in FIG. 14, the memory (and/or storage media) 136 may include several categories of software and data used in the data processing system: an operating system 152; application programs 154; input/output device drivers 158; and data 156. As will be appreciated by those of skill in the art, the operating system 152 may be any operating system suitable for use with a data processing system, such as IBM®, OS/2®, AIX® or zOS® operating systems or Microsoft® Windows®95, Windows98, Windows2000 or WindowsXP operating systems, Unix or Linux™, IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 158 typically include software routines accessed through the operating system 152 by the application programs 154 to communicate with devices such as the input/output circuits 146 and certain memory 136 components. The application programs 154 are illustrative of the programs that implement the various features of the circuits and modules according to some embodiments of the present invention. Finally, the data 156 represents the static and dynamic data used by the application programs 154 the operating system 152 the input/output device drivers 158 and other software programs that may reside in the memory 136.

The data 156 may include (archived or stored) digital image data sets 126 correlated to respective patients. As further illustrated in FIG. 14, according to some embodiments of the present invention, the application programs 154 include a High/Low Magnification-Specific Image Enhancement Module 124. The application programs can include a Color Deconvolution Channel Separation Module 125 and/or a Subsampling Module 126. The data interface module can be decoupled or isolated from the visualization/viewer module. The application program 154 may be located in a local server (or processor) and/or database or a remote server (or processor) and/or database, or combinations of local and remote databases and/or servers.

While the present invention is illustrated with reference to the application programs 154, and Modules 124, 125 and 126 in FIG. 14, as will be appreciated by those of skill in the art, other configurations fall within the scope of the present invention. For example, rather than being application programs 154 these circuits and modules may also be incorporated into the operating system 152 or other such logical division of the data processing system. Furthermore, while the application programs 124, 125, 126 are illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 14 but may be provided by other arrangements and/or divisions of functions between data processing systems. For example, although FIG. 14 is illustrated as having various circuits and modules, one or more of these circuits or modules may be combined or separated without departing from the scope of the present invention.

The invention will now be described below with the following non-limiting Examples.

EXAMPLES

As discussed above, image processing algorithms in pathology commonly include automated decision points such as classifications. While this technique may allow for efficient automation, there is also a risk that errors are induced. A different paradigm is to use image processing for enhancements without introducing explicit classifications. Such enhancements can help pathologists to increase efficiency without sacrificing accuracy. This paradigm has been applied to Ki-67 hot spot detection according to embodiments of the present invention. Ki-67 scoring is a routine analysis to quantify the proliferation rate of tumor cells. Cell counting in the hot spot, the region of highest concentration of positive tumor cells, is a method increasingly used in clinical routine. An obstacle for this method is that while hot spot selection is a task suitable for low magnification, high magnification is needed to discern positive nuclei, thus the pathologist must perform many zooming operations. Embodiments of the invention address this issue by an image processing method that increases the visibility of the positive nuclei at low magnification levels. This tool displays the modified version at low magnification, while gradually blending into the original image at high magnification.

The tool was evaluated in a feasibility study with four pathologists targeting routine clinical use. In a task to compare hot spot concentrations, the average accuracy was 75±4.1% using the tool and 69±4.6% without it (n=4). Feedback on the system, gathered in follow-up interviews, was that the pathologists found the tool useful and fitting in their existing diagnostic process. The pathologists judged the tool to be feasible for implementation in clinical routine.

Accurate grading of breast cancer from histology samples is a challenging task for the pathologist due to the heterogeneous nature of the disease. Ki-67 is a commonly used immunohistochemical assessment to quantify the proliferation rate of tumor cells (Dowsett, Nielsen et al. 2011). Ki-67 scoring has been criticized due to its subjective nature as well as a lack of standardized protocols (Romero, Bendahl et al. 2011). This method lacks consistency and uniformity and thus gives rise to inter and intra-observer variability (Tang, Gonen et al. 2012, Varga, Diebold et al. 2012). Despite this downside, the usage of Ki-67 as a prognostic indicator for breast cancer is supported by recent research results (Aleskandarany, Rakha et al. 2011, Honma, Horii et al. 2013). Ki-67 assessment using hot spots is becoming increasingly prevalent in clinical use. The Swedish Pathologists Association (Patologi 2013) and the Royal College of Pathologists (Stephenson T J 2009) in London have suggested using hot spots to score the Ki-67 index for breast cancer and endocrine tumors respectively.

However hot spot detection in whole slide images is cumbersome. To be able to see and compare all different regions of a whole slide image at the same time, the pathologist often need to zoom out to 1× magnification (10 microns/pixel) depending on the size of the screen used and the size of the tissue sample. At that magnification, many cell nuclei are smaller than a pixel and will not be visible. Using a larger screen with increased resolution could in some cases be a solution but that is not always convenient or cost effective.

The new viewer tool provided by embodiments of the invention can be a semi-automated method that artificially increases the size of the positive nuclei at low magnification. By enlarging the nuclei and making them more visible, variability due to subjectivity may be reduced by making the choice of hot spot more obvious. This is in contrast with a fully automatic approach which tries to reduce the variability due to subjectivity by removing the pathologists from the decision process, making them a passive observer.

Methods

A dataset of 11 digital whole slide images from the Pathology Department of Linkoping University Hospital, Sweden, were included in a study using the new tool. The specimens were stained with the Ki-67 antibody MIB1 combined with the Diaminobenzidine (DAB) cytochrome and then counterstained with Hematoxylin. The slides were scanned using an Aperio AT Turbo scanner at 20× magnification (0.5 microns/pixel). To artificially increase the size of the positive nuclei at low magnification, the following image processing algorithm was used.

In the first step, the image was separated into color channels using the color deconvolution algorithm described in (Ruifrok and Johnston 2001). Two channels were created, a brown and a blue channel representing the DAB and Hemotoxylin staining respectively. The brown channel contained mostly positive nuclei, and the blue channel contained other artifacts such as negative nuclei, cytoplasma and stroma. Since the color deconvolution separated out the positive nuclei, the enlargement effect was achieved by filtering the brown channel using a Gaussian kernel with a sigma size of 25 pixels, which caused the positive nuclei to almost double in size. To compensate for the decreased intensity caused by the Gaussian filter, the contrast of the brown channel was then increased using a fixed linear look up table. The blue channel was discarded as it did not provide any visual enhancement for the hot spots.

As a second step, dyadic subsampled pyramids for different magnification levels (20×, 10×, 5×, . . . ) of the modified brown channel and the unmodified image were created. For each magnification level, a specific mix of the modified brown channel and the unmodified image was created. The mix at each level was chosen so that the low magnification levels would be dominated by enlarged brown cells and the high magnification levels stay unmodified, the levels are given in Table 1.

To evaluate the feasibility of the tool for clinical use, four pathologists with varying degree of experience were recruited from Stockholm South General Hospital and Linkoping University Hospital, Sweden. For the establishment of the ground truth, an experienced pathologist compiled a dataset of candidate hot spots within the 11 whole slide images. The hot spots were divided up into 64 pair wise comparisons, for each pair, the preferred hot spot (having the highest positive tumor cell count) was determined at full magnification. Any pair without an evident difference was removed from the trial, which then finally consisted of 50 pair wise comparisons.

The task of the trial participants was to go through the 50 preselected pairs and select their preferred hot spot in each pair. 25 pairs were selected in a mode using the modified images and the remaining 25 with the original image at 1× magnification. The order of the pairs was randomized. After a 4 week washout period, the participants again selected their preferred hot spot for each pair, but in the opposite mode. The average detection rate, standard deviation as well as a paired T-test was calculated.

Results

The task was completed by four pathologists in two trial sessions. The hot spot detection rate using original histology images were 69±4.6%. Using the Ki-67 hot spot detection tool, a detection rate of 75±4.1% was obtained. While the proposed method, on average performed better, the difference may not be considered statistically significant using a paired T-test (p=0.136) for this limited number of participants. Larger studies may provide even better performance.

A factor potentially causing bias in favor of the original images was that the participants' viewing distances were not restricted. It was noted that the participants tended to get closer to the display when viewing the unmodified images.

In interviews following the task different aspects, one primary advantage was the fact that the tool did not interfere with their usual way of examining hot spots, namely, panning around at around 5× looking for candidate hot spots. This tool as provided in the study only added to that experience by operating at a lower magnification with an improved the sense of orientation and context as a result. The pathologists did, however, not agree whether 5× was the best limit between the manipulated and un-manipulated images. The more experienced pathologists preferred a lower limit at around 2.5× while less experienced pathologists preferred a slightly higher limit.

Thus, embodiments of the invention provide a novel hot spot detection tool based on a method paradigm meeting demands from clinical routine work: use image processing to aid the pathologist without introducing explicit classifications. The low magnification levels can be used for visualization of generated data, without interfering with the pathologists' usual way of examining the whole slide images.

A possible improvement of the tool used in the study may include a (slightly) increased contrast of the blue channel to increase the contrast between tumor and non-tumor cells. Other embodiments include the subsampling (percentile) estimator function as described above with respect to FIG. 7B and FIGS. 9A-9D.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A method of processing digital pathology and cytology images for viewing, comprising:
    programmatically visually enhancing at least one feature of interest in an original digital pathology or cytology image of a tissue sample, where the at least one feature is otherwise visually apparent only in a high magnification view, using data from the tissue sample image at a resolution corresponding to a high magnification view so that the at least one feature is visually apparent in a low magnification image view;
    electronically displaying the at least one visually enhanced feature on a display in a partial or whole slide image low magnification view; and
    allowing a user to electronically zoom the displayed low magnification view into a high magnification view, wherein the visual enhancement is electronically automatically removed during the zoom to high magnification.

2. The method of claim 1, wherein the at least one feature of interest that is visually enhanced is pre-defined as being clinically relevant to a disease state and is associated with a defined color.

3. A method of processing digital pathology and cytology images for viewing, comprising:
    programmatically visually enhancing at least one feature of interest in an original digital pathology or cytology image of a tissue sample using data from the tissue sample image at a resolution corresponding to a high magnification view so that the at least one feature is visually apparent in a low magnification image view; and
    electronically displaying the at least one visually enhanced feature of interest on a display in a partial and/or whole slide image low magnification view,
    wherein the programmatic visual enhancement is carried out by electronically sub-sampling the original pathology or cytology image so that the at least one feature of interest in the low magnification image view has an expanded extent with an artificially enlarged or increased size relative to other features and relative to its size in a non-visually enhanced corresponding low magnification image view for the at least one feature of interest associated with at least one defined color from the high-magnification view of the original pathology or cytology image and presenting the at least one feature of interest with the expanded extent in the visually enhanced low magnification partial and/or whole slide image view.

4. The method of claim 3, wherein the at least one defined color corresponds to at least one color found in the original digital image at one or more magnification levels and only the at least one feature with the defined color has the expanded extent in the low magnification view, and wherein the visually enhanced at least one feature of interest maintains a respective corresponding at least one color found in the original digital tissue sample image to provide a color correspondence from the one or more high magnifications to provide a visual cue of correspondence.

5. The method of claim 1, wherein the visually enhanced at least one feature comprises stained nuclei having a predefined color, and wherein the programmatic visual enhancement is carried out so that the stained nuclei are presented with an expanded extent in the visually enhanced whole slide image low magnification view with the at least one extracted feature having an artificially enlarged or increased size.

6. The method of claim 1, wherein the visually enhanced at least one feature comprises stained nuclei having an associated color, and wherein the programmatic visual enhancement is carried out so that the stained nuclei are presented with an increased intensity in the visually enhanced low magnification whole slide image view.

7. The method of claim 1, wherein the visually enhanced at least one feature comprises stained nuclei having an associated color, and wherein the programmatic visual enhancement is carried out to decrease intensity, fade and/or omit features with colors different from the color associated with the stained nuclei to thereby visually emphasize the stained nuclei.

8. The method of claim 5, further comprising electronically applying hot spot detection of the stained nuclei using the visually enhanced stained nuclei in the whole slide image low magnification view.

9. The method of claim 1, wherein the visually enhanced at least one feature has an associated pre-defined color indicative of a disease that is shown (a) in an expanded extent and (b) with at least one of an increased intensity and/or darker color in the low magnification whole slide image view relative to the at least one feature in a corresponding view of a non-visually enhanced original obtained image.

10. The method of claim 1, wherein the programmatic enhancement is carried out by:
electronically color deconvolving a high magnification view of the obtained image to create at least first and second separate color channels, at least one of which is for a defined color associated with a clinically relevant target feature;
electronically subsampling the first and second channels to desired magnifications; and then
electronically generating the visually enhanced low magnification image view by blending the channels.

11. The method of claim 3, wherein the programmatic enhancement is carried out by:
electronically color deconvolving a high magnification view of the obtained image to create at least first and second separate color channels, one of which is for a defined color associated with a clinically relevant target feature;
electronically subsampling pixel values in local regions of the obtained image at different defined subsampling percentiles for different zooms; and
electronically generating a plurality of different low magnification levels with respective different visual enhancement appearances of the at least one visually enhanced feature based on the different percentiles of the subsampling.

12. The method of claim 11, wherein the subsampling percentile increases as the magnification level decreases to generate the different visual enhancement appearances of the same visually enhanced at least one feature at different low magnification levels or ranges of levels, and wherein the visually enhanced feature at the low magnification levels is not subsampled and remains unenhanced at high magnification views above 10×.

13. The method of claim 1, wherein the programmatic enhancement is carried out by electronically applying a color-based, nearest-neighbor subsampling, wherein a subsampled pixel value is a value closest to a defined reference color in a color space.

14. A method of processing digital pathology and cytology images for viewing, comprising:
programmatically visually enhancing at least one feature of interest in an original digital pathology or cytology image of a tissue sample, where the at least one feature is otherwise visually apparent only in a low magnification view, using data from the tissue sample image at a resolution corresponding to a low magnification view, so that the at least one feature is visually apparent in the high magnification image view, and electronically displaying the at least one visually enhanced feature on a display in a partial or whole slide image high magnification view,
wherein the displaying comprises providing distance from border indicia as the visually enhanced feature in the high magnification view, and wherein the distance from border indicia comprises an overlay with distance in millimeters determined using the low magnification data.

15. The method of claim 1, further comprising allowing a user to use a user interface to selectively display the low magnification image view with the visually enhanced at least one feature along with an original non-visually enhanced corresponding low magnification image view for evaluation of the effect of the programmatic visual enhancement.

16. The method of claim 1, further comprising allowing a user to use a user interface (UI) to selectively fade the visually enhanced at least one feature to an original low magnification image view on the display or to fade an original low magnification whole slide image view on the display to the low magnification whole slide image view with the visually enhanced at least one feature to thereby allow a visual evaluation of the visual enhancement.

17. The method of claim 1, wherein the obtained image is a two-dimensional (2-D) Whole Slide Image (WSI) having between about $1\times10^6$ pixels to about $1\times10^{12}$ pixels.

18. The method of claim 1, wherein the obtained image is a three-dimensional (3-D) Whole Slide Image (WSI), wherein a z extent has a plurality of slices across a depth of a tissue section with less pixels in the z extent relative to x and y extents.

19. The method of claim 3, wherein the programmatically visually enhancing is carried out to visually enhance only a pixel or pixels of the at least one feature of interest found in an original digital pathology or cytology image of a tissue sample at one or more high magnifications so that the at least one feature is visually apparent in the low magnification sub-sampled image view, and wherein only the at least one feature with the pixel or pixels of the visually enhanced at least one feature has the expanded extent in the low magnification image view and maintains a color correspondence from the one or more high magnifications to provide a visual cue of correspondence.

20. The method of claim 14, wherein the method further comprises allowing a user to electronically zoom a displayed low magnification view into a high magnification view, wherein the visual enhancement is electronically removed during the zoom such that only the original non-visually enhanced image is shown at a defined high magnification level above about 10×.

21. The method of claim 14, further comprising displaying a single navigation view on the display that allows image navigation, wherein the single navigation view comprises a high magnification sub-slide image with the distance from border indicia which can dynamically change as a user navigates over the tissue sample through different high-magnification views.

22. A method of providing different magnification views of digital pathology and cytology images using a viewer, comprising:
- obtaining an original digital pathology or cytology Whole Slide Image (WSI) of a tissue sample having a data set of between about $10^4 \times 10^4$ pixels to about $10^6 \times 10^6$ pixels;
- programmatically extracting at least one feature of potential clinical relevance at a first magnification level;
- programmatically visually enhancing the at least one extracted feature so that it appears in an image view at one or more different second magnification levels in a visually enhanced manner relative to an unenhanced corresponding at least one feature at a corresponding magnification level; and
- allowing a user to electronically zoom a displayed low magnification view into a high magnification view, wherein the visual enhancement of the at least one extracted feature is electronically automatically removed at high magnification.

23. A computer program product for providing whole slide image (WSI) viewers, the computer program product comprising:
- a non-transitory computer readable storage medium having computer readable program code embodied in the medium, the computer-readable program code comprising:
- computer readable program code configured to receive an original whole slide image (WSI) of a pathology or cytology sample of a subject;
- computer readable program code configured to automatically extract at least one defined feature at a first magnification level and enhance the extracted at least one defined feature so that it appears in an image view at a different second magnification level in a visually enhanced manner relative to a corresponding unenhanced feature in the WSI at the second magnification level; and
- computer readable program code configured to allow a user to electronically zoom a displayed low magnification view into a high magnification view while removing the visual enhancement at high magnification image views.

24. A system for evaluating Whole Slide Images (WSI), comprising:
- a display; and
- a circuit in communication with the display, the circuit comprising at least one processor configured to provide a feature enhancing zoom, wherein the circuit is configured to automatically identify and/or extract at least one feature of a respective WSI at a first magnification and alter the identified and/or extracted at least one feature so that the at least one feature appears visually enhanced in an image view at a different second magnification relative to a corresponding unenhanced at least one feature in the WSI at the different second magnification, and wherein the circuit is further configured to allow a user to electronically zoom a displayed low magnification view into a high magnification view while automatically removing the visual enhancement at one or more high magnification image views.

25. A viewer for evaluating Whole Slide Images (WSI), comprising:
- a circuit in communication with a display, the circuit comprising at least one processor configured to sub-sample pixels of an original digital pathology or cytology tissue sample whole slide image to visually selectively enhance only at least one feature of interest in the original digital pathology or cytology image relative to other features using color or colors of a pixel or pixels of the at least one feature from the original tissue sample image at a resolution corresponding to a high magnification view so that the at least one feature is visually apparent in a low magnification image view, wherein the pixel or pixels of the visually enhanced at least one feature maintains a correspondence of color or colors between the original tissue sample image at the high magnification view and the low magnification image view to provide a visual cue of correspondence.

* * * * *